United States Patent
Bronstein et al.

(10) Patent No.: US 10,775,501 B2
(45) Date of Patent: Sep. 15, 2020

(54) RANGE RECONSTRUCTION USING SHAPE PRIOR

(71) Applicant: Intel Corporation, Santa Clara, CA (US)

(72) Inventors: Alex Bronstein, Haifa (IL); Michael Bronstein, Lugano (CH); David H. Silver, Haifa (IL); Ron Kimmel, Haifa (IL); Erez Sperling, D.N. Menashe (IL); Vitaly Surazhsky, Yokneam Illit (IL); Aviad Zabatani, Even Yehuda (IL); Ohad Menashe, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 580 days.

(21) Appl. No.: 15/611,041

(22) Filed: Jun. 1, 2017

(65) Prior Publication Data

US 2018/0348368 A1 Dec. 6, 2018

(51) Int. Cl.

| G01S 17/08 | (2006.01) |
| --- | --- |
| G01S 17/89 | (2020.01) |
| G06T 7/521 | (2017.01) |
| G01S 7/481 | (2006.01) |
| G01S 7/48 | (2006.01) |
| G01S 17/10 | (2020.01) |
| G01S 17/42 | (2006.01) |

(52) U.S. Cl.
CPC ............ *G01S 17/08* (2013.01); *G01S 7/4802* (2013.01); *G01S 7/4815* (2013.01); *G01S 17/10* (2013.01); *G01S 17/42* (2013.01); *G01S 17/89* (2013.01); *G06T 7/521* (2017.01); *G06T 2207/10028* (2013.01); *G06T 2207/30164* (2013.01)

(58) Field of Classification Search
None
See application file for complete search history.

(56) References Cited

U.S. PATENT DOCUMENTS

| 8,494,687 | B2 * | 7/2013 | Vanek | G01S 7/4808 356/4.01 |
| --- | --- | --- | --- | --- |
| 2004/0217260 | A1 * | 11/2004 | Bernardini | G01J 1/08 250/208.1 |
| 2013/0116977 | A1 * | 5/2013 | Godbaz | G01S 17/89 702/189 |
| 2014/0093159 | A1 * | 4/2014 | Nguyen | G06T 19/20 382/154 |

(Continued)

*Primary Examiner* — Lina M Cordero
(74) *Attorney, Agent, or Firm* — Finch & Maloney PLLC

(57) ABSTRACT

Arrangements (e.g., apparatus, system, method, article of manufacture) for reconstructing a depth image of a scene. Some embodiments include: a processor; and a non-transitory computer readable medium to store a set of instructions for execution by the processor, the set of instructions to cause the processor to perform various operations. Operations include: collecting multiple data sets for a code-modulated light pulse reflected from an object in a scene, with each data set associated with a direction in a set of directions for the reflected code-modulated light pulse; assigning a fitness value to each data set based on one or more parameters of a model; and reconstructing a depth image providing a depth at each direction based on a corresponding data set and fitness value, the depth to correspond with a round-trip delay time of the code-modulated light pulse.

25 Claims, 8 Drawing Sheets

(56) References Cited

U.S. PATENT DOCUMENTS

| | | | |
|---|---|---|---|
| 2015/0023588 A1* | 1/2015 | Barone | G06T 7/593 |
| | | | 382/154 |
| 2015/0062370 A1* | 3/2015 | Shroff | H04N 5/2226 |
| | | | 348/222.1 |
| 2018/0120857 A1* | 5/2018 | Kappauf | G01S 17/86 |
| 2018/0130176 A1* | 5/2018 | Castorena Martinez | |
| | | | G01S 7/4808 |
| 2018/0203113 A1* | 7/2018 | Taylor | G01S 17/023 |
| 2018/0299554 A1* | 10/2018 | Van Dyck | G01S 17/89 |
| 2018/0372870 A1* | 12/2018 | Puglia | G01S 17/10 |

* cited by examiner

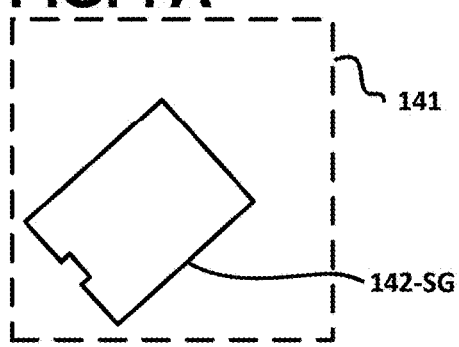
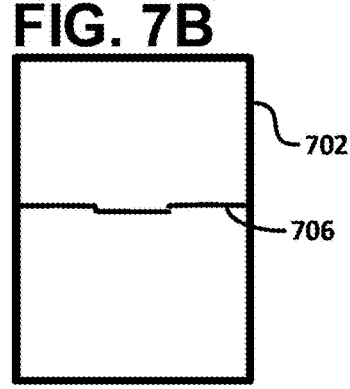
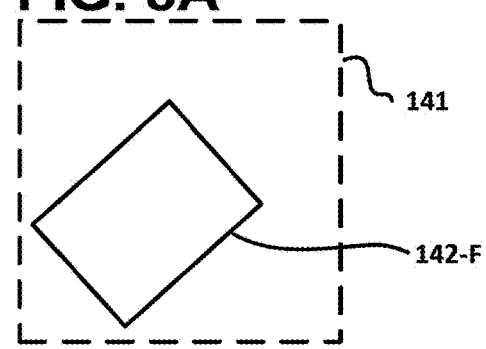
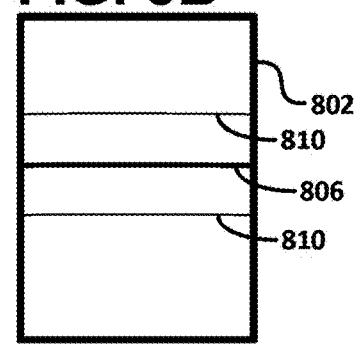
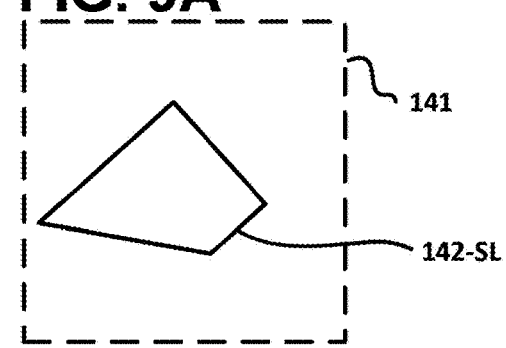
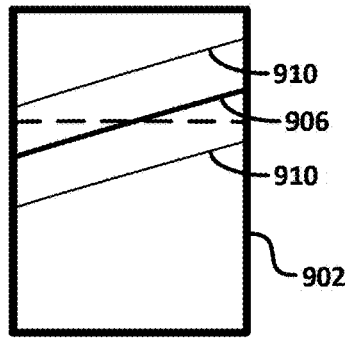
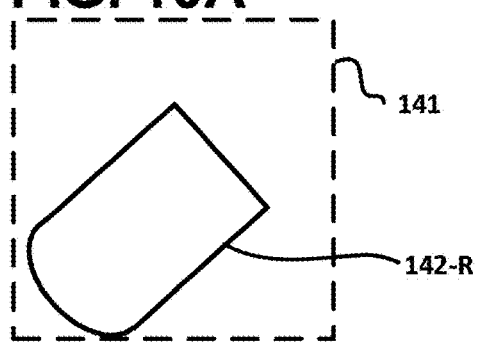
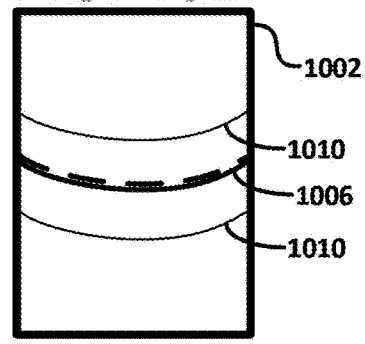

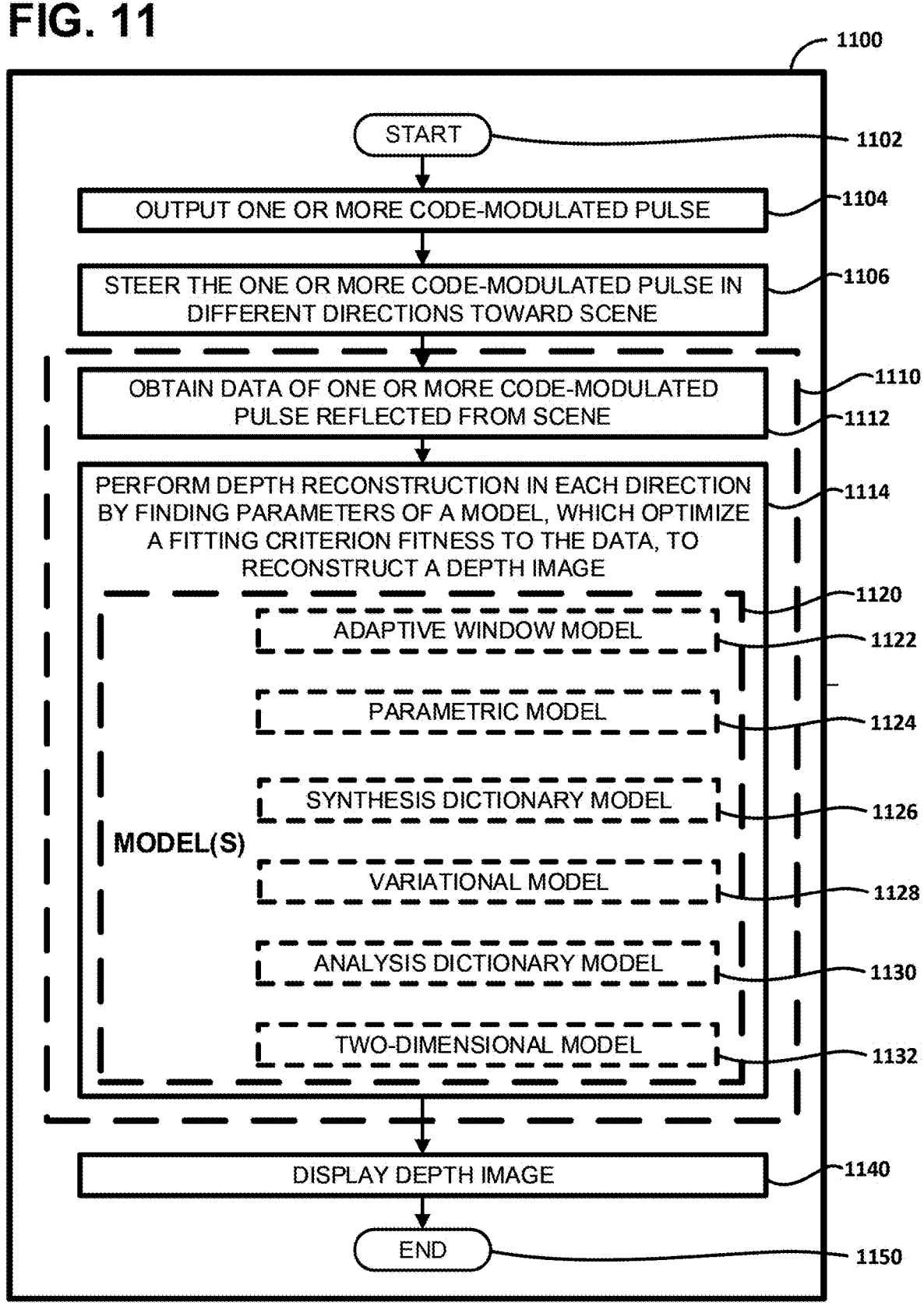

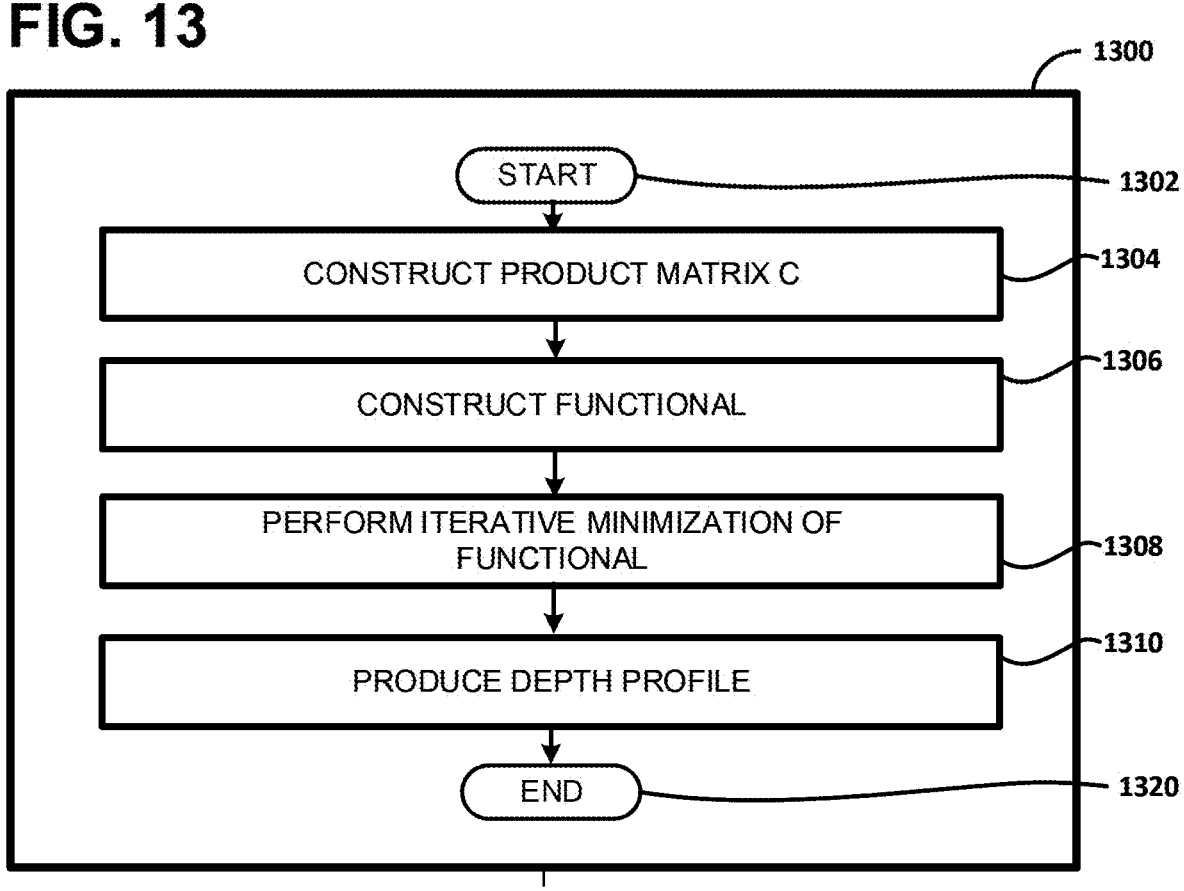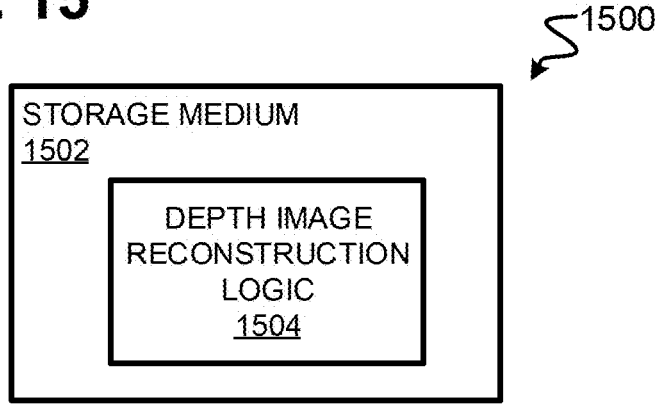

RANGE RECONSTRUCTION USING SHAPE PRIOR

TECHNICAL FIELD

Examples described herein are generally related to improved light detection and ranging (LIDAR) arrangements to reconstruct a depth image of a scene, the depth image detailing a depth at each of a collection of directions.

BACKGROUND

LIDAR arrangements are becoming more popular over time, especially with the increasing need for depth imaging for autonomously driven vehicles (e.g., automobiles; drones). Improvements to LIDAR arrangements may generally broaden LIDAR applications and/or usage, and may lead to reduction in LIDAR costs over time. For example, improvements in depth imaging speed, accuracy, versatility, adaptability, etc., would assist in achieving such goals.

BRIEF DESCRIPTION OF THE DRAWINGS

FIG. 3 illustrates an example perspective view of LIDAR light projection applied in a single direction.

FIGS. 7A-B to 10A-B illustrate example objects and example reconstructed depth images related thereto.

FIG. 11 illustrates an example flowchart implemented within a LIDAR system of an example embodiment.

FIG. 13 describes an example flow of depth image construction by minimization of a functional.

FIG. 15 illustrates one embodiment of an article of manufacture 1100.

DETAILED DESCRIPTION

Embodiments of the present disclosure include techniques and configurations for an optoelectronic assembly for LIDAR arrangements to reconstruct a depth image of a scene. Apparatus, device and system embodiments may include a processor, as well as a non-transitory computer readable medium to store a set of instructions for execution by the processor. In operation, embodiments may obtain data of a code-modulated light pulse reflected from an object in a scene, where a round-trip delay time of the light pulse is proportional to a depth of the object from the apparatus. Further, the embodiments may reconstruct a depth image detailing a depth at each of a collection of directions, where depth reconstruction of the depth in each subject direction in the depth image is performed by finding parameters of a model, which improve a fitting criterion fitness to the data at at least one direction surrounding the subject direction.

Such embodiments have the technical effects of: faster depth image reconstruction; improved depth image reconstruction accuracy; restricting a result of reconstruction to a subspace of signals of interest; including prior information (e.g., from other directions or pixels) about the shape of the range profile $\tau(t)$ in depth image reconstruction; use of models in depth image reconstruction; adapting depth image reconstruction in real-time during reconstruction, by changing models in real-time; and allowing better depth reconstruction in the presence of strong noise and multi-path interference.

In the following detailed description, reference is made to the accompanying drawings which form a part hereof, wherein like numerals designate like parts throughout. Shown by way of illustration are embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Figure 1:
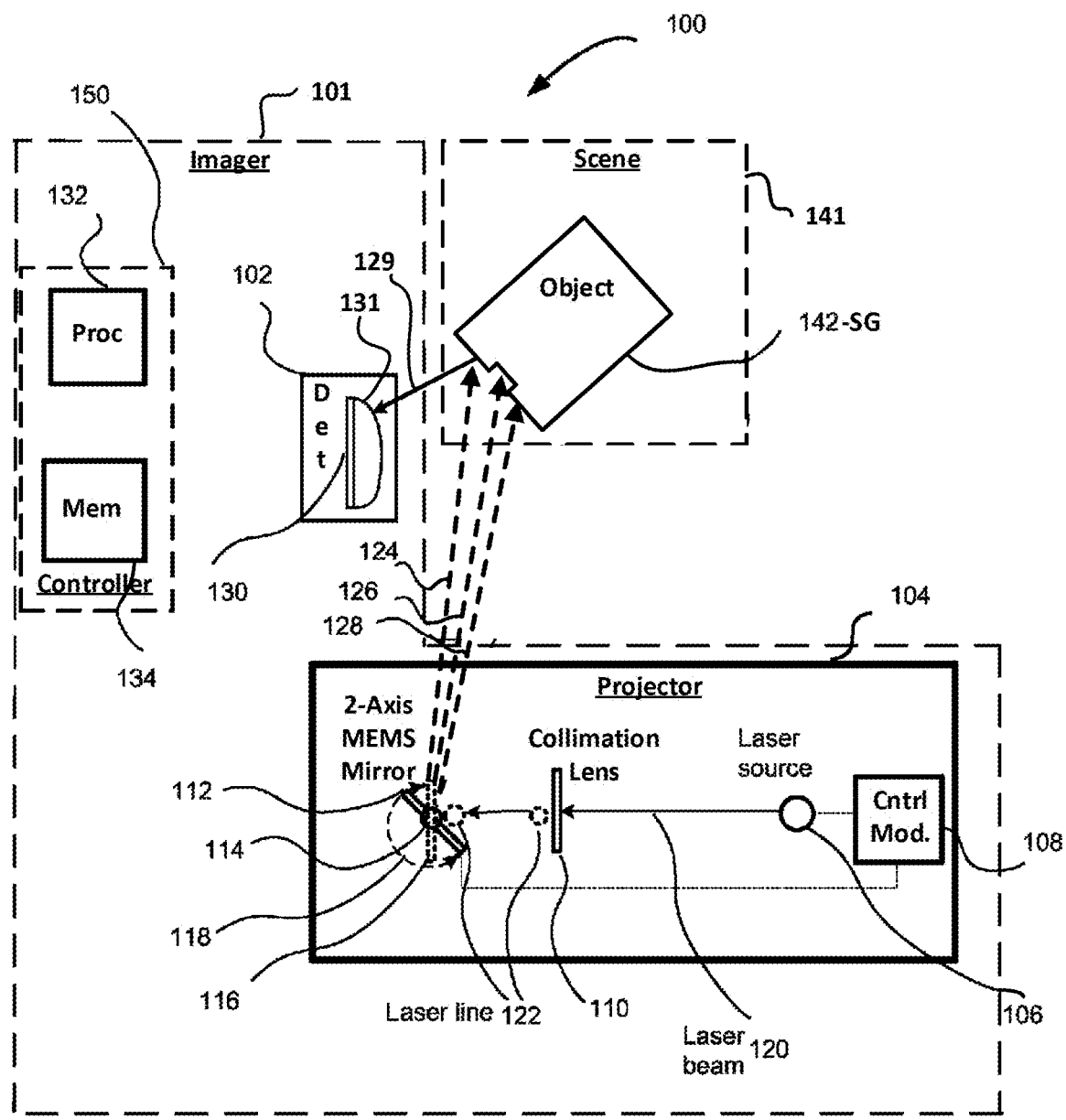
FIG. 1 illustrates an example of a LIDAR system.

FIG. 1 illustrates an example of a LIDAR system. More particularly, FIG. 1 schematically illustrates an example device 100 for LIDAR depth image reconstruction in accordance with some embodiments of the present disclosure. In some embodiments, the device 100 may include an imager 101 or any other device configured for light projection toward a scene 141, and for light data acquisition of light reflected back from the scene. In some embodiments, as illustrated, the imager 101 may include a reflected light capturing device 102 (e.g., a photomultiplier; digital camera) and a light projector unit 104, such as a laser projector or laser scanner 104, having a number of components. In some embodiments, the light capturing device 102 may include an infrared (IR) camera, and the projector unit 104 may include an IR projector. Practice of embodiments is in no way limited to such example light generators, projectors or detectors, and other approaches may be used.

The light projector unit 104 may include a light source 106, such as a laser device configured to provide a laser beam 120, where the light source 106 may be coupled with a control module 108. The control module 108 may be implemented as a software or hardware module, or a combination thereof. In some embodiments, the control module 108 may include a hardware implementation. The control module 108 may be configured to control (e.g., modulate) an optical power of the laser beam 120 provided by the laser source 106, e.g., to encode a pulse of such laser beam with a known or predetermined code (e.g., signature). Practice of embodiments is in no way limited to such example control functions, and other types of control may also be included.

The laser arrangement may further include an optical lens 110. The laser source 106 and the optical lens 110 may be configured so that modulated laser beam 120 may pass through the optical lens 110. The lens 110 may be a lens configured to focus light which passes through on to a line instead of on to a point, in contrast to a spherical lens, for example. In some embodiments, the lens 110 may include one or more of a collimation lens or a cylindrical lens. Accordingly, in one example, the lens 110 may be configured to transform the laser beam 120 passing through the lens 110 into a laser line 122. For better understanding of a spatial disposition of the laser line 122, note that the laser line 122 may be disposed on a plane that is perpendicular to the plane of FIG. 1. Accordingly, the laser line 122 formed from the laser beam 120 passing through the lens 110 is shown as perpendicular to the plane of FIG. 1. Practice of embodiments is in no way limited to such example light arrangements, and other approaches may be used.

The laser line 122 may be received and deflected by a tiltable or rotatable mirror 112 of device 100, and ultimately directing, during mirror tilting, the laser 122 in multiple laser directions or planes, such as example ones indicated by numerals 124, 126, and 128. That is, it is important for an understanding of the present embodiments that because of mirror tilting or scanning over time, the aiming of the direction of the laser will correspondingly change from one instance to another. Accordingly, over time, the laser projections toward the scene 141 will form a fan-like spread of differing laser directions. A laser beam at one side of the fan will be projected in a specific direction, while a laser beam at an opposite side of the fan will be projected in a differing (e.g., unique) direction. In fact, any two laser beams such as adjacent laser beams projected at differing instances of time within the fan pattern will have differing laser directions from each other. Further, laser beam projections at each instance of time, will each have mutually differing directions from one another. Practice of embodiments is in no way limited to such example fan-like spread of laser directions, or to use of only a single laser projection, and other approaches may be used.

In embodiments of the present disclosure, the laser beam is continuously encoded with a predetermined code (e.g., via amplitude modulation), and is continuously output. Further, the mirror and thus the laser beam is continuously scanned, such that the encoded laser beam is continuously scanned in a fan-shaped pattern into the scene 141.

In some embodiments, the mirror 112 may be a micro-electromechanical system (MEMS) scanning mirror. In some embodiments, a mirror surface of MEMS scanning mirror 112 may be made of silicon (Si), although different materials providing required properties related to scanning mirror reflection qualities may be utilized in various embodiments. In some embodiments, the mirror 112 may be a single-axis (e.g., rotating hexagonal) mirror, while in other embodiments the mirror 112 may be a two-axis MEMS scanning mirror or a two-mirror system. In some embodiments, the MEMS scanning mirror 112 may be configured to be at least partially tiltable (rotatable) around the axis 114, in order to deflect the laser line 122 so as to produce light patterns projected by the mirror 112 to an object 142 and defined by the laser planes 124, 126, 128. For example, the mirror 112 may be tiltable, as shown representatively by dashed arc 118, at least from its resting position indicated by the numeral 116 to the mirror positioned as indicated by 112.

Tilting is conducted to provide a scan angle that ensures a desired dimension for the light patterns defined by the exit laser directions or planes 124, 126, 128. The axis 114 may be substantially parallel to the laser line 122. Further, the MEMS scanning mirror 112 may be disposed within a plane that is perpendicular to the plane of FIG. 1, and may be tiltable around the axis 114, as shown. Accordingly, the laser planes 124, 126, 128 may also be substantially perpendicular to the plane of FIG. 1. In some embodiments, the control module 108 may be configured to control the tilting of the MEMS scanning mirror 112, or a rotation of a rotatable mirror.

It should be understood by one skilled in the art that the projector unit 104 configured to project the light pattern as described above may include a one-dimensional coded projector and the light patterns may include one-dimensional coded light patterns, e.g., the patterns that may be described by one-dimensional or linear codes. The light patterns formed by the laser planes 124, 126, 128 on a surface of the object 142 may be reflected 129 and then received by the image capturing device 102, and sensed (e.g., read) by a detector or sensor 130 of the image capturing device 102. That is, a lens 131 on the sensor 130 may capture and deliver light reflections to the sensor 130. Based on the readings of the multiple scans of the light patterns accumulated during a sensing cycle of the sensor 130, the device 100 may be configured to reconstruct a depth image with respect to the shape of the object 142. Within FIG. 1, object 142 is more specifically an example object 142-SG having a sharp groove (SG) therein. Further, the object 142-SG is located within a scene 141 or scanning volume which is scannable by the imager 101.

In some embodiments, the device 100 may further include another image capturing device, such as digital camera (not shown). In some embodiments, the digital camera may have a light capturing mode and/or resolution that is different than that of the light capturing device 102. For example, the digital camera may be a multi-chromatic camera, such as red, green, and blue (RGB) camera configured to capture texture images of the object 142. Practice of embodiments is in no way limited to such examples, and other types of cameras may be used.

The device 100 may include a controller 150 that may be associated with, or independent from, the control module 108 described above. The controller 150 may include a processor 132, coupled with a memory 134 configured to enable the above-noted and other functionalities of the device 100. For example, the processor 132 may be configured with executable instructions stored in the memory 134 to enable or effect functional operations of the laser source 106, control module 108, and MEMS scanning mirror 112 as described herein. Further, the controller 150 may be configured to reconstruct a depth image of the object 142 based on data captured by the light capturing device 102, for example, using geometrical, formulaic or other techniques used for 3D image reconstruction. The controller 150 may be further configured to dynamically calibrate one or more components of the device 100 to correct for distortions in the reconstructed image of the object 142 that may be caused, for example, by variations of the angle of the light pattern projection by the MEMS scanning mirror 112 that may be caused by various external factors (e.g., barometric pressure, temperature, humidity, or displacement of the MEMS scanning mirror 112). Practice of embodiments is in no way limited to such examples, and other approaches may be used.

In some embodiments, the device 100 described herein may further include additional components. For example, the processor 132, the memory 134, and/or other components of the controller 150 may comport with a processor-based system that may be a part of, or include, the device 100, in accordance with some embodiments. For example, the processor may actually be a multi-processor arrangement having multiple microprocessors. In some embodiments, the processor 132 may be implemented as a combination of a software and hardware components. In some embodiments, the processor 132 may include a hardware implementation. The memory 134 for one embodiment may include any suitable volatile memory, such as suitable Dynamic Random Access Memory (DRAM), for example. Practice of embodiments is in no way limited to such examples, and other arrangements may be used.

In some embodiments, the memory 134 may include instructions that, when executed on the processor 132, cause the device 100 to perform operations of the control module 108. That is, the control module 108 may be implemented as a software component stored, e.g., in the memory 134 and configured to execute on the processor 132.

The processor 132, memory 134, other components (not shown), light capturing device 102, and projector unit 104 may be coupled with one or more interfaces (not shown) configured to facilitate information exchange among the above-mentioned components. Further, communications interface(s) (not shown) may provide an interface for the device 100 to communicate over one or more wired or wireless network(s) and/or with any other suitable device. In various embodiments, the device 100 may be included to or associated with, but is not limited to, a server, a workstation, a desktop computing device, or a mobile computing device (e.g., a laptop computing device, a handheld computing device, a handset, a tablet, a smartphone, a netbook, ultrabook, etc.).

In various embodiments, the device 100 may have more or less components, and/or different architectures. For example, in some embodiments, the device 100 may include one or more of a camera, a keyboard, display such as a liquid crystal display (LCD) screen (including touch screen displays), a touch screen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like. In various embodiments, the imager 101, controller 150 and/or light projector unit 104 may have more or less components, and/or different architectures. In various embodiments, techniques and configurations described herein may be used in a variety of systems that benefit from the principles described herein such as optoelectronic, electro-optical, MEMS devices and systems, and the like.

Figure 2:
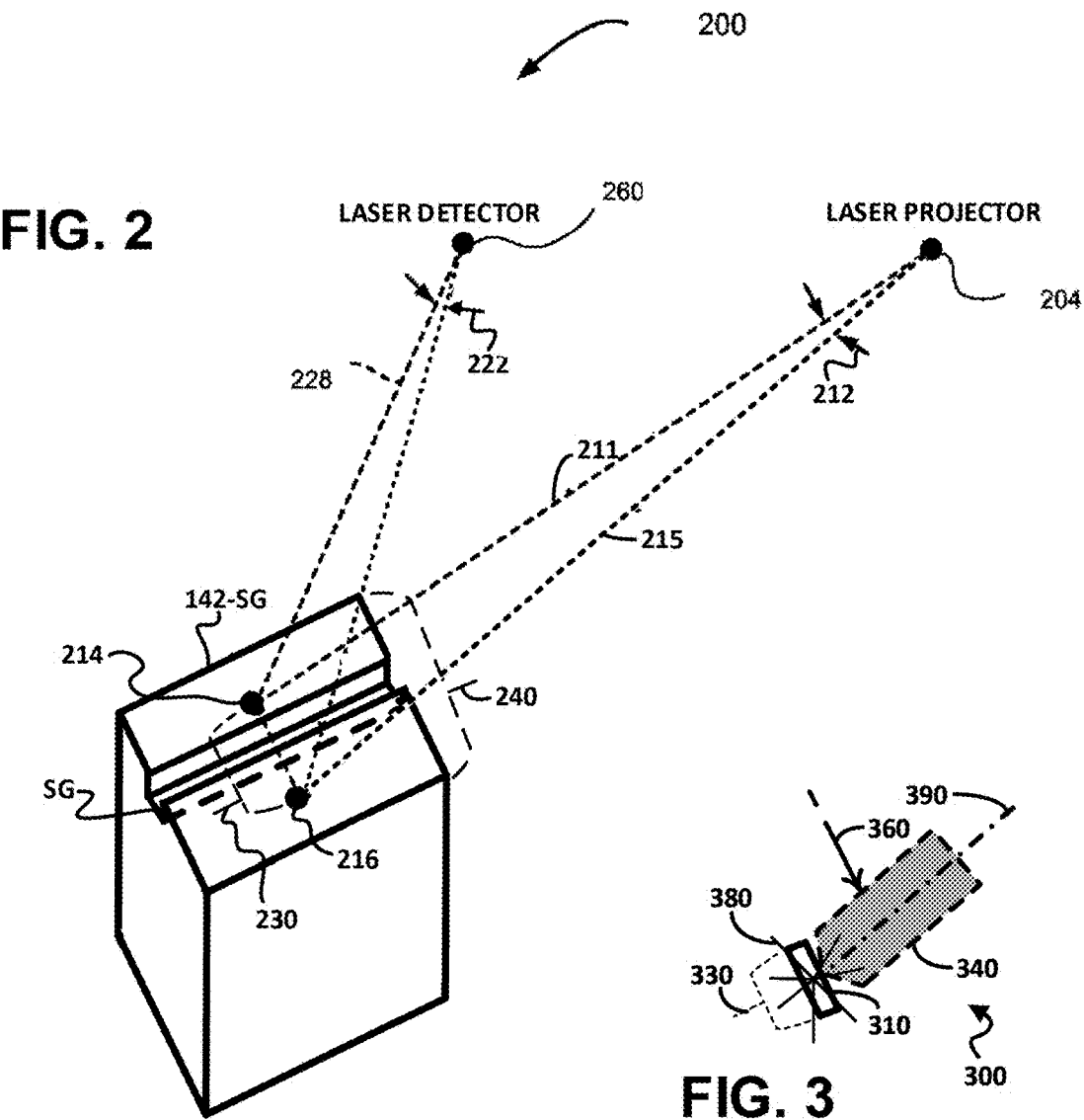
FIG. 2 illustrates an example perspective view of LIDAR light projection, reflection and detection with respect to an example object.

In operation, the projector 104 may project and scan light (e.g., including one-dimensional coded light patterns) on an object 142, such as example object 142-SG. The light capturing device 102 may capture object 142-SG images, as will now be described in greater detail with respect to FIG. 2. More particularly, FIG. 2 illustrates an example perspective view 200 of LIDAR light projection, reflection and detection with respect to an example object 142-SG. Object 142-SG has an object width shown via bracket 240, and has a sharp groove SG running a length thereof.

A laser projects from a laser projector source point 204 and scans across a range 212, to project onto the object 142-SG. The laser scans across a scanning range 212 to scan from a first laser direction 211 or scan start point 214 to a last laser direction 215 or scan end point 216 across a portion of the width as shown via bracket (scanned range) 230. In the FIG. 2 example illustrated, the scanned range 230 includes scanning of a portion of an upper surface of the object 142-SG, and scanning across the sharp groove SG.

Light impinging on the object 142-SG is reflected by the object 142-SG, and reflected light 228 within a detection range or window 222 may be received at a laser detector detection point or window 260 for light data acquisition of light reflected back from the object or scene. Such light data may be stored (e.g., within memory) for later processing into a depth image, or may be immediately processed into a depth image.

Regarding laser direction which may be relevant in later discussions, it is noted that the laser impinging upon the scan start point 214 may be said to have (or be aimed by the mirror in) one direction, while the laser impinging upon the scan end point 216 may be said to have (or be aimed by the mirror in) a different direction. Further, the laser impinging upon each point located between the scan start and end points may be said to each have its own unique (different) direction, respectively. That is, as the laser is continuously scanned in, for example, a fan-shaped aiming by the mirror across the object, the aiming direction of the mirror and thus a direction of the laser is continuously changed. Because the aiming direction of the mirror is continuously changed, so too is the direction of adjacent laser beams continuously changed.

Discussion turns next to more detail for a better understanding of a scanning with respect to embodiments. More particularly, FIG. 3 illustrates an example perspective view 300 of LIDAR light projection applied in a single direction 390. Single direction means that the laser is aimed at one spot and an angular posture of the laser beam is not changed. Such may be accomplished in practice by not moving (e.g., freezing a position of) the mirror, or may represent a snapshot taken of a scanned laser at a particular instance of time during scanning 360. FIG. 3 shows the laser 340 impinging upon a surface at a single direction 390 and reflecting in plural directions, the laser having a footprint 310 with a length range shown by a bracket 330 on the surface. In some embodiments, the footprint 310 defined by the laser beam impinging at a single direction may be called a "pixel". Light reflected and detected from the impingement via the single laser direction 390, may be said to be light data with respect to one (i.e., a single) laser direction or one (i.e., single) pixel.

A main disadvantage of use of data with respect to a single direction or pixel is the fact that it includes no prior information (e.g., from other directions or pixels) about the shape of the range profile τ(t). Accordingly, as an improvement, embodiments herein advantageously utilize data from more than one laser direction or pixel, and thus include prior information (e.g., from other laser directions or pixels) about the shape of the range profile τ(t), in the determination of a depth image.

Figure 4:
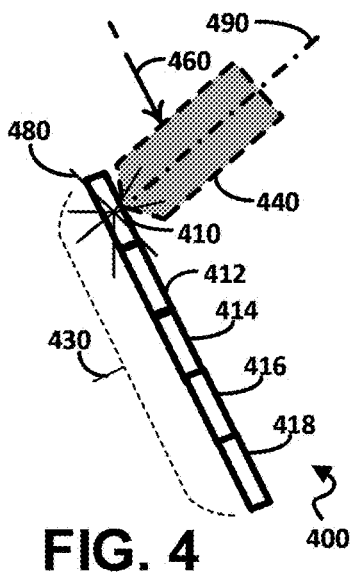
FIG. 4 illustrates an example perspective view of LIDAR light projection applied across multiple directions.

More particularly, the example perspective view 400 of FIG. 4 illustrates a laser 440 impinging and reflecting 480 upon a surface and being scanned 460 across a surface within a range shown by a bracket 430. While the laser beam is continuously scanned in a fan-shaped pattern as mentioned previously such that there are no pixels per se, the present discussions will illustrate example snapshotted pixels to aid in an explanation and understanding of the present embodiments. More particularly, five instantaneous snapshots of the laser 440 as it scans 460 across the surface may result in the five representative pixels 410, 412, 414, 416, 418 as shown in FIG. 4.

While the laser 440 will be aimed in the direction 490 in relation to pixel 410, the laser 440 will (in relation to the pixels 412, 414, 416, 418) be aimed in four unique directions (not shown) which are different from the direction 490 and also unique from the directions of each other. If direction 490 is taken as a subject direction, then light reflected and detected from the impingement of the five pixels via the multiple (or plural) laser directions or pixels, may be said to be light data including data of at least one direction surrounding the subject direction. As additional options, the light reflected and detected from the impingement of the five pixels via the multiple (or plural) laser directions or pixels may be said to be said to be data sets, or may be said to be multi-directional or multi-pixel light data, or alternatively, plural-directional or plural-pixel light data. Embodiments herein advantageously utilize such multi-directional or multi-pixel light data from more than one data set, laser direction or pixel, to include prior information (e.g., from other data sets, laser directions or pixels) about the shape of the range profile τ(t), in the determination of a depth image.

While the above example embodiment has been described using five snapshotted pixels and five directions, it should be understood that in practice, light data being detected by a light detector is continuous as the laser is continuously scanned across the surface. Given that the angle or direction of the laser is continuously changing as the laser is scanned, the continuous light data detected over time will inherently include multi-directional light data from more than one laser direction, and thus will include prior information (e.g., from other laser directions).

Although five directions or pixels are illustrated with respect to the FIG. 4 example, practice of embodiments is in no way limited to a range of five data sets, directions or pixels. That is, more than five data sets, directions or pixels, or as little as two data sets, directions or pixels may be used in practice of the embodiments. For convenience of description and understanding, the concept of a two data sets, directions or pixels will be used. For example, FIG. 5 illustrates an example perspective view 500 of a laser 540 impinging and reflecting 580 upon a surface while being scanned 560 across a surface within a two-pixel 510, 512 range shown by a bracket 530.

While the laser 540 will be aimed in the direction 590 in relation to pixel 510, the laser 540 will be aimed in a second unique direction (not shown) in relation to the second pixel 512, which is different from the direction 590. If direction 590 is taken as a subject direction, then light reflected and detected from the impingement of the second pixel via the second laser direction or pixel, may be said to be light data including data of at least one direction surrounding the subject direction. As additional options, the light reflected and detected from the impingement of the two pixels via the multiple (or plural) laser directions or pixels may be said to be two data sets of light data, or may be said to be multi-directional or multi-pixel light data, or alternatively, plural-directional or plural-pixel light data. Embodiments herein advantageously utilize such multi-directional or multi-pixel light data from more than one laser direction or pixel, to include prior information (e.g., from other laser directions or pixels) about the shape of the range profile τ(t), in the determination of a depth image. Again, practice of embodiments of the present disclosure may not distinguish two individualized pixels with respect to detected light data, i.e., all that is necessary is that the light data contain light data from at least two directions to include prior information (e.g., from other laser directions) about the shape of the range profile τ(t), in the determination of a depth image.

Figure 5:
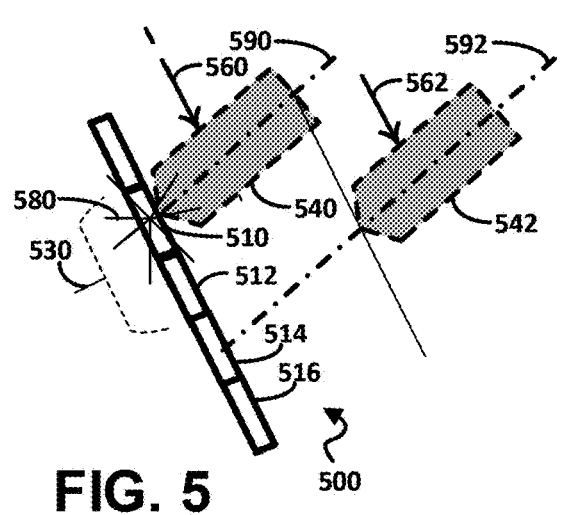
FIG. 5 illustrates an example perspective view of plural LIDAR light projections applied across multiple directions.

Example FIG. 5 is further illustrative of the fact that practice of the embodiments is not limited to use of only one (i.e., a single) laser beam to perform scanning. More particularly, FIG. 5 further illustrates additional use of a second laser 542 to impinge and reflect while being scanned 562 across the surface within a next two-pixel 514, 516 range. The second laser 542 may, in one embodiment, impinge and scan upon the surface immediately following impingement and scanning by the first laser 540, i.e., the first and second lasers may be scanned sequentially along the surface. Practice of embodiments is in no way limited to sequential scanning with respect to multiple lasers. In another embodiment, the first and second lasers may be scanned simultaneously along the surface. Simultaneous scanning with two or more lasers is advantageous in allowing scanning of the surface (or scene) to be completed within a shorter period.

However, in instances where multiple lasers are scanned simultaneously, suitable accommodation should be made to allow reflections from the first laser to be distinguishable from reflections from the second laser. As one example, a first laser having light emissions which are orthogonal to light emissions of the second laser, and first and second detectors which are able to detect orthogonal light from such lasers, respectively, may be used to make reflections distinguishable. As another example, a first laser beam having light at a first frequency, a second laser beam having light at a second frequency distinguishable from the first, and first and second detectors which are able to detect the differing frequencies, respectively, may be used to make reflections distinguishable. Practice of embodiments is in no way limited to such examples, and other approaches may be used.

FIG. 5's multiple (e.g., first and second) lasers may be from differing light sources, or may be from a common light source where an initially emitted laser is split into multiple lasers, e.g., using one or more orthogonal mirror or filter. Again, practice of embodiments is in no way limited to such examples, and other approaches may be used.

Finally, while FIG. 5's laser 542 will be aimed in the direction 592 in relation to pixel 514, the laser 542 will be aimed in a second unique direction (not shown) in relation to the second pixel 516, which is different from the direction 592.

Figure 6:
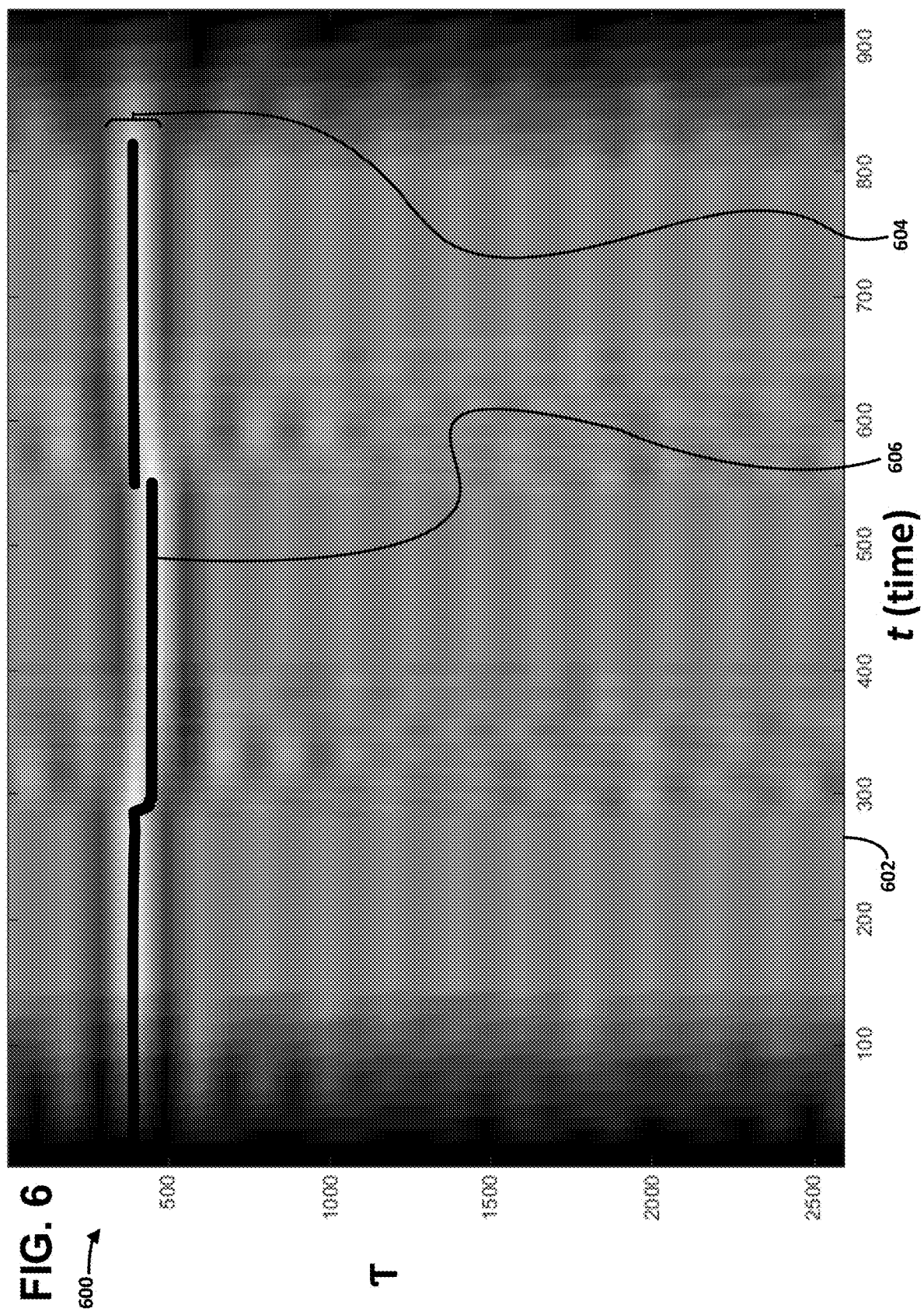
FIG. 6 illustrates example light data reflected from an example object in a scene of FIG. 1, and an example reconstructed depth image.

In continuing discussions, FIG. 6 illustrates an example plot 600 of light data 602 resultant from reflections from FIG. 1's example object 142-SG in scene 141. An "X" or horizontal axis represents a time t and is scaled in a predetermined time increment (e.g., milliseconds), while a "Y" or vertical axis represents depth τ and is scaled in a predetermined measurement increment (e.g., centimeters). Given that the laser scans across the surface of the object over time, the horizontal or time axis may be alternatively viewed as representing or corresponding to points or locations across the scanned surface of the object. For example, time t=0 may alternatively represent the location on the surface corresponding to the FIG. 2 first-scanned point 214, whereas time t=900 may alternatively represent the location on the surface corresponding to the FIG. 2 last-scanned point 216. Further, given that each point or location across the scanned surface is impinged with a differing direction of the laser, the data 602 can be said to be a data with respect to a collection of differing laser directions. The lighter portion bands 604 of the data 602 may represent the values of τ where receipt of the reflected light is greatest. In some instances, such bands may or may not be perceptible to the human eye in visually viewing the plot 600, and may be determinable only via processing.

In any event, depth reconstruction embodiments described herein reconstruct a depth image detailing a depth at each of a collection of directions, where depth reconstruction of the depth in each subject direction in the depth image is performed by finding parameters of a model (examples described ahead), which optimize a fitting criterion fitness to the data at at least one direction surrounding the subject direction. For example, a depth at FIG. 6's time 400 (alternatively a subject direction 400 of a laser) may be reconstructed by finding parameters of a model (examples described further ahead), which optimize a fitting criterion fitness to the data at FIG. 6's time 399 (alternatively, another direction 399) surrounding the time 400 (the laser at time 399 having a differing direction than time 400's subject direction). Practice of embodiments is in no way limited to use of data with respect to only two instances or time (or laser directions). That is, as another example, embodiments may optimize a fitting criterion fitness to the data at FIG. 6's times 300-399 and/or 401-499 surrounding the time 400 (the laser at such times having differing directions than time 400's subject direction).

Once embodiments have determined parameters which optimize the fitting criterion, embodiments utilize the parameters together with the model to determine depth reconstruction and to output a depth image. FIG. 6 illustrates an example depth image 606. It can be seen that the FIG. 6 depth image has two upper depths and a lower depth which appear to correspond to the upper surfaces and sharp groove (SG), respectively, of the width portion 230 scanned between the FIG. 2 scan start point 214 and scan end point 216. That is, the arrangement of depths within the depth image 606 corresponds or coincides nicely to the arrangement of depths of the scanned width portion 230.

At this point, it is also mentioned that the projection of the laser from a singular point such as via the movable mirror, and in a fan-shaped pattern, may result in some distortion with respect to received image data. More particularly, for understanding, assume for a moment that the movable mirror is positioned to project a laser perpendicular to the central point of a flat object. As the mirror swings to project the laser to the left or to the right of the central point, the actual depth or distance to the object will increase relative to the swinging, as the laser is now projected at a slant to the object rather than perpendicularly. As a result, the travel time to the object and reflection back to the detector will take longer in comparison to the perpendicular central point. Accordingly, image data for the central point will have the shortest round-trip time, whereas image data for left or right points will have longer and longer round-trip times as the laser is further slanted and projected farther and farther to the left or right away from the central point. If the image data is accepted as is and processed without correction, a resultant depth image might show the object as dome-shaped instead of flat. Accordingly, embodiments may apply corrective offsets, computations, etc., to compensate for known distortions.

In continuing discussions, FIGS. 7A and 7B show a side-to-side comparison of the sharp grooved object 142-SG, and its corresponding depth image 706 (e.g., after distortion correction) provided within screen 702. That is, if a central portion (as shown in FIG. 2) of the object 142-SG is subjected to scanning, the depth image 706 reconstructed shows depths which closely correspond (i.e., match) the actual depths of the object.

FIGS. 8A and 8B similarly show a side-to-side comparison, but this time of a flat-surfaced object 142-F provided within the scene 141. Similarly, if a central portion of the object 142-F is subjected to scanning, the depth image 806 reconstructed within screen 802 shows a constant or flat depth which closely corresponds (i.e., matches) the constant or flat surface of the object. FIG. 8B's images 810 further might show side-lobes of the code autocorrelation function.

Next, FIGS. 9A and 9B similarly show a side-to-side comparison, but this time of a slant-surfaced object 142-SL provided within the scene 141. Similarly, if a central portion of the object 142-SL is subjected to scanning, the depth image 906 reconstructed within screen 902 shows a slanting or ramped depth which closely corresponds (i.e., matches) the slanted or ramped surface of the object. FIG. 9B's images 910 and 920 further might show side-lobes of the code autocorrelation function.

As a final side-to-side comparison, a rounded object 142-R, and its corresponding depth image 1006 provided within screen 1002, are illustrated within FIGS. 10A and 10B, respectively. That is, if a central portion of the object 142-R is subjected to scanning, the depth image 1006 reconstructed shows depths which closely correspond (i.e., match) the actual depths of the object. FIG. 10B's images 1010 and 1020 further might show side-lobes of the code autocorrelation function.

Next, FIG. 11 illustrates an example flowchart 1100 implemented within a LIDAR system of an example embodiment. More particularly, after start 1102, the embodiment may output one or more code-modulated pulse as shown in operation 1104. In one embodiment, a continuous laser pulse is continuously output and code-modulated at predetermined times.

As one example, the code-modulation may be provided periodically. In another example, the code-modulation may be provided randomly. Practice of embodiments are in no way limited to such examples, and other approaches to code-modulation may be used.

In a differing embodiment, the laser may be provided as plural separate pulses which may be supplied from a single laser source, or from plural laser sources. Each pulse may be code-modulated at predetermined times (e.g., periodically) or may be code-modulated at random times. Practice of embodiments are in no way limited to such examples, and other approaches to code-modulation may be used.

Next, in an operation 1106, the one or more code-modulated pulse is steered in differing directions toward the scene. Light impinging on any object would be reflected by the object.

In operation 1112, data of one or more code-modulated pulse reflected from the scene are obtained. Obtaining may be via reflected light within a detection range or window being received at a laser detector detection point or window for light data acquisition of light reflected back from the object or scene, for immediate or direct processing of image data (detected in real-time) into the depth image. Immediate or direct processing may be useful for, and even required in, operations of autonomous vehicles (i.e., driver-less cars, drones, etc.). Alternatively, light data which had been previously stored (e.g., within memory) for later analysis may be obtained for processing into the depth image. Stored light data and delayed processing may be acceptable for less time-sensitive applications. For example, a drone may fly over an entire orchard recording light data, and the stored light data may be later be processed for an analysis of a health of the orchard (e.g., are there any fallen trees, low foliage trees, etc.).

Continuing, in operation 1114, depth reconstruction is performed in each direction by finding parameters of a model 1120, which optimize a fitting criterion fitness to the data, to reconstruct a depth image. A non-exhaustive listing of example types of models which may be utilized with embodiments include: an adaptive window model 1122; a parametric model 1124; a synthesis dictionary model 1126; a variational model 1128; an analysis dictionary model 1130; and a two-dimensional model 1132. Practice of embodiments is in no way limited to such example models, and other models may be used.

At operation 1140, a depth image is displayed or outputted. Thereafter, operations are ended 1150.

In a narrower embodiment, flow operations 1112-1132 (enclosed within the FIG. 11 dashed block 1110) may be conducted, whereas other FIG. 11 operations are not. For example, an integrated or packaged optoelectronic assembly for LIDAR arrangements, which performs flow operations 1112-1132 may be offered by a LIDAR component manufacturer. Alternatively, an integrated or packaged optoelectronic assembly for LIDAR arrangements, which performs all of FIG. 11's flow operations 1102-1140 (or other subsets thereof) may be offered.

Regarding further embodiments, in one embodiment, only one (i.e., a single) model of the plural models 1122, 1124, 1126, 1128, 1130, 1132 may be available and used in a depth image reconstruction session. Such may be accomplished, for example, by having only one (i.e., a single) model available within (e.g., built into) the embodiment, or by having plural models available (e.g., built in) but activating or using only one of the plural models 1122, 1124, 1126, 1128, 1130, 1132 during the depth image reconstruction session. In one embodiment, the single model activated or used may be changed from session-to-session, e.g., by activating only the model of interest, and deactivating all other models. Selection and activation may be based upon some predetermined criteria, for example: a model known to achieve fast and/or accurate results with scenes having flat surfaces, may be activated and used for a subject scene suspected of having flat surfaces: a model known to achieve fast and/or accurate results with scenes having irregular surfaces, may be activated and used for a subject scene suspected of having irregular surfaces; etc.

In another embodiment, a sub-set (multiple) of the plural models 1122, 1124, 1126, 1128, 1130, 1132 may be available and used in a depth image reconstruction session. Such may be accomplished, for example, by having only the sub-set (multiple) of the plural models available within (e.g., built into) the embodiment, or by having additional models available within (e.g., built in) but activating or using only sub-set (multiple) of available plural models during the depth image reconstruction session. In one embodiment, the sub-set of models activated or used may be changed from session-to-session, e.g., by activating only the models of interest, and deactivating all other models. In one embodiment, the sub-set of models activated or used may be changed dynamically (i.e., in real-time) within a session, e.g., by dynamically activating only the models of interest at a given time or portion of the scene, and deactivating all other models. Selection and activation may be based upon some predetermined criteria, for example: a model known to achieve fast and/or accurate results with scenes having flat surfaces, may be activated and used for a subject scene suspected of having flat surfaces: a model known to achieve fast and/or accurate results with scenes having irregular surfaces, may be activated and used for a subject scene suspected of having irregular surfaces; etc.

In another embodiment, all of the plural models 1122, 1124, 1126, 1128, 1130, 1132 may be available and used in a depth image reconstruction session.

Regarding use of multiple models within a session, in one embodiment, models may be used sequentially (e.g., one-after-the-other). In another embodiment, the models may be used in parallel (e.g., via different processors of a multi-processor arrangement, but not necessarily at the same time). In still another embodiment, the models may be used concurrently (at the same time). In yet another embodiment, the models may be used in overlapping manner (at least partially at the same time).

Discussion turns next to various models, including background models as well as specific example models useable with practice of the present embodiments. First, as a background signal formation model, in considering a coded LIDAR measurement system, such system may include a modulated laser beam transmitting intensity x(t) at every time t, and a beam steering mechanism (e.g., a MENS mirror) pointing the beam to a certain direction $\varphi(t)$. The reflected light is collected by a detector, producing the measured signal:

$$y(t)=a(t)x(t-\tau(t))+n(t),$$

where:

"a" is an unknown attenuation factor (stemming, in part) from the distance and the reflectance properties of the scene);

"n" is a measurement noise;

"t" is time;

"x" is a modulated laser beam transmitting intensity;

"y" is the measured signal at the receiver; and,

"$\tau$" is an unknown delay of the signal (which, up to a constant, is equivalent to a range (e.g., depth or distance).

For simplicity, units in which the delay r is quantitatively identical to the distance may be used.

The goal is to reconstruct the range profile, $\tau(t)$. Instead of reconstructing $\tau(\varphi)$ (range as function of the angular or spatial location), one can reconstruct $\tau(t)$ (range as function of time); the relation between $\varphi$ and t can be assumed linear at least in a time interval, provided that $\ddot{\varphi}(t)$ is sufficiently small (where $\ddot{\varphi}$ is second-order time derivative of $\varphi$).

A disadvantageous cross-correlation approach to the above problem is by calculating, for example, a cross-correlation function:

$$c_t(\tau)=\int_{W_t} x(t'-\tau)y(t')dt',$$

where:

"$c_t$" is the cross-correlation of the received and transmitted signals around time t;

"$W_t$" is a window centered around time t;

"x" is a modulated laser beam transmitting intensity;

"y" is the received signal at the receiver; and,

"$\tau$" is the delay of the signal proportional to the object depth.

That is, integration is performed in a window $W_t$ centered around time t and finding its maximum given by:

$$\tau_*(t) = \arg\max_\tau c_t(\tau)$$

where:

"$c_t$" is the cross-correlation of the received and transmitted signals around time t;

"t" is time;

"$\tau$" is the delay of the signal; and subscript "*" denote the optimal solution.

Instead of the actual transmitted x(t), the cross-correlation may also be computed with some other template, $\bar{x}(t)$ resulting in what is known as heterodyne detection. Typically, when the transmitted code is periodic, the window W is chosen to include an integer of its periods.

Discussion transitions from the above background models to proposed models useable in practice of the present embodiments. As mentioned previously, one main disadvantage of the cross-correlation approach is the fact that it includes no prior information about the shape of the range profile $\tau(t)$. For typical scenes, signals obtained from light detection contains rich structure that should be exploited, for example, by restricting the result of the reconstruction to the subspace of signals of interest. In what follows, discussions introduce a family of range reconstruction problems and related algorithms that allow to incorporate various priors on $\tau(t)$.

Discussion starts by considering a function:

$$C(t,\tau)=x(t-\tau)y(t),$$

where:
"C" is the matrix of shifted product of the transmitted and received signals;
"t" is time;
"x" is a modulated laser beam transmitting intensity;
"y" is the received signal at the receiver; and,
"τ" is the delay of the signal.

(Again, some other template $\bar{x}(t)$ may be used in lieu of $x(t)$). Furthermore, the function can be constructed with some smoothing in a small window, such as by:

$$C(t,\tau)=\int_{t-\delta}^{t+\delta}x(t'-\tau)y(t')dt',$$

where:
"C" is cross-correlation of the received and transmitted signals restricted to a short window;
"t" is time;
"x" is a modulated laser beam transmitting intensity;
"y" is the received signal at the receiver; and,
"τ" is a phase shift or delay of the signal; and,
"δ" is the short window size.

It is proposed to recover τ(t) by solving the following general optimization problem:

$$\tau^* = \arg\max_{\tau \in \mathcal{T}} \int_0^T C(t, \tau(t))dt,$$

where:
"C" is the matrix of shifted product of the transmitted and received signals or a smoothed version thereof;
"t" is time;
"τ" is a phase shift or delay of the signal;
"$\mathcal{T}$" is a family of curves describing admissible phase shift profiles;
"T" is the window size; and,
"*" denotes optimal solution.

That is, where the integration is taken over the entire duration of the signal, and $\mathcal{T}$ denotes some family of curves τ: $[0, T] \to [\tau_{min}, \tau_{max}]$.

In what follows, further discussions list a few particular cases defining $\mathcal{T}$ and dwell on the specific optimization algorithms for their solution.

More particularly, regarding an "adaptive window" model, in many practical cases, the function τ(t) might be discontinuous (e.g., at object boundaries). Using a fixed correlation window as the classical approach suggest would degrade the quality of the cross-correlation peak. Ideally, it is proposed to find an interval $[t_1, t_2]$ within the entire window $[0, T]$ on which to search for the cross-correlation peak. To that end, it is proposed to seek two parameters $0 \le t_1 < t_2 \le T$ such that the peak of the following function is sufficiently distinguishable:

$$C_{[t_1,t_2]}(\tau)=\int_{t_1}^{t_2}C(t',\tau(t))dt,$$

where:
"C" is the matrix of shifted product of the transmitted and received signals or a smoothed version thereof;
"t" is time; and
"τ" is a phase shift or delay of the signal.

This can be evaluated, e.g., by the value of the peak, or the ratio between it and the second-highest local maximum, or a combination of these two criteria.

In turning discussions next to "parametric" models, assume that τ(t) can be parameterized by some vector $\theta \in \mathbb{R}^k$ [where θ is a vector of parameters; $\mathbb{R}$ is the standard Euclidean space; and k is the number of parameters in the model]. For example, a zeroth-order model asserts:

$$\tau_\theta(t)=\theta,$$

where:
"t" is time;
"τ" is a phase shift or delay of the signal; and
"θ" is the depth of the plane in time units.

Enforcing this model is somewhat like the cross-correlation approach. A first-order model asserts that the range profile is a ramp:

$$\tau_\theta=\theta_1+\theta_2 t,$$

where:
"t" is time;
"τ" is a phase shift or delay of the signal; and
"θ" is 2-vector containing the depth of the plane and its slope in time units.

For a reasonably-sized k, the solution can be carried out using the Hough transform.

Next, "synthesis dictionary" models can be considered a variant of parametric models. More particularly, in denoting by $d(t)^T=(d_1(t), \ldots, d_k(t))$ as a collection of continuous atoms of the dictionary, and r may be represented by the following function, via asserting that τ(t) is a sparse linear combination of the $d_i(t)$'s:

$$\tau_\theta(t)=d(t)^T\theta,$$

where:
"t" is time;
"τ" is a phase shift or delay of the signal;
"T" denotes a vector transpose; and,
"θ" is the set of k coefficients of the linear combination.

Sparsity may be enforced by adding, e.g., the $l_1$ norm penalty to the optimization problem (where $l_1$ is the regular 1-norm of a vector):

$$\tau^* d(t)^T \arg\max_\theta \int_0^T C(t, d(t)^T\theta)dt - \lambda\|\theta\|_1,$$

where:
"C" is the matrix of shifted product of the transmitted and received signals or a smoothed version thereof;
"t" is time;
"τ" is a phase shift or delay of the signal;
"T" denotes a vector transpose;
"*" denotes optimal solution;
"θ" is the set of linear combination coefficients; and,
"λ" is a regularization parameter.

Alternative, a greedy approach such as orthogonal matching pursuit may be used.

Discussion turns next to an example "variational" model. Instead of specifying T parametrically, one can introduce a term R(t) to the optimization objective penalizing for irregular solutions:

$$\tau^* = \arg\max_{\tau(t)} \int_0^T C(t, \tau(t))dt - R(\tau),$$

where:
"C" is the matrix of shifted product of the transmitted and received signals or a smoothed version thereof;
"R" is regularization functional;

"t" is time;
"τ" is the delay of the signal;
"T" is integration time; and,
"*" denotes optimal solution.

In this case, the problem can be tackled, for example, as finding the (regularized) shortest path, for which efficient dynamic programming solvers (dynamic time warp in the discrete case or fast marching in the continuous case) exist.

Another "analysis dictionary" model may be considered a particular case of the variational approach, in which $R(\tau)$ is obtained via projection of r on an analysis dictionary and demanding sparsity in it, e.g.:

$$R(\tau) = \Sigma_i \int_0^T |(h_i * \tau)(t)| dt,$$

where:
"$h_i$" is the i-th filter in a filter bank;
"R" is the regularization functional;
"t" is time;
"τ" is the delay of the signal;
"T" is integration time; and,
"*" denotes convolution.

That is, where $h_i(t)$ is a collection of shift-invariant filters. One particular case may be h(t) being the derivative operator, yielding the total variation of $\tau(t)$.

A final example model discussed is a "two-dimensional" model. As one example, the assumption of a one-dimensional (single scan-line) τ can be generalized to full two-dimensional case, using, for example:

$$C_\eta(t,\tau) = x(t-\tau)y_\eta(t),$$

where:
"C" is the matrix of shifted product of the transmitted and received signals or a smoothed version thereof;
"η" is a spatial coordinate perpendicular to a scanning direction (i.e., a scanline number).
"t" is time;
"τ" is a phase shift or delay of the signal;
"x" is the transmitted signal;
"y" is the received signal at the receiver; and,
"η" is a spatial coordinate perpendicular to a scanning direction (i.e., a scanline number).

The one-dimensional optimization problem mentioned previously can be straightforwardly generalized to two dimensions as follows:

$$\tau^* = \arg\max_{\tau \in \mathcal{T}} \int\int_0^T C_\eta(t, \tau(t, \eta)) dt d\eta,$$

where:
"C" is the matrix of shifted product of the transmitted and received signals or a smoothed version thereof computed as shown in the $C_\eta(t, \tau) = \ldots$ equation mentioned previously.
"t" is time;
"τ" is a phase shift or delay of the signal;
"$\mathcal{T}$" is a family of models describing the depth image;
"T" is integration time;
"*" denotes optimal solution; and,
"η" is a spatial coordinate perpendicular to a scanning direction (i.e., a scanline number).

Figure 12:
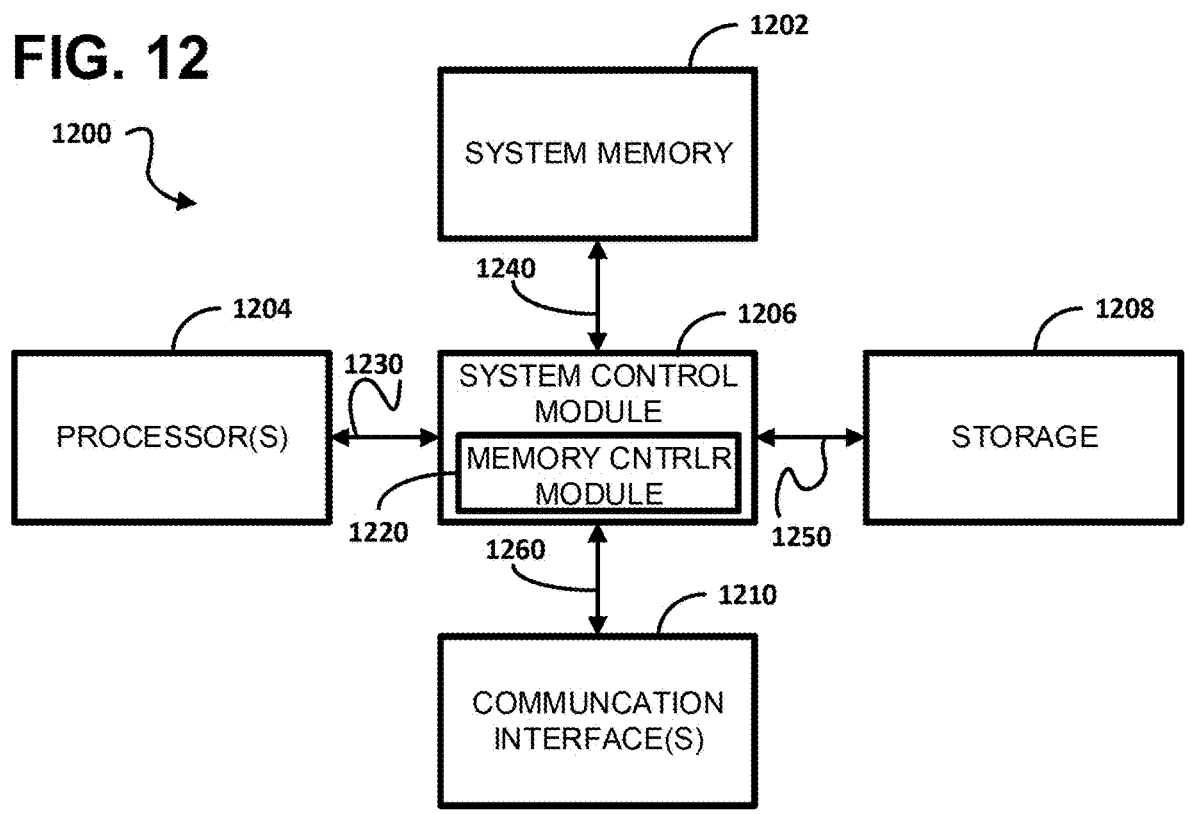
FIG. 12 illustrates example components of an example LIDAR system.

FIG. 12 schematically illustrates an example system that may be used to practice various embodiments described herein. More specifically, the example system of FIG. 12 may include an optoelectronic assembly for 3D object acquisition and depth image reconstruction as described in reference to the previous FIGS.

FIG. 12 illustrates, for one embodiment, an example system 1200 having one or more processor(s) 1204, system control module 1206 coupled to at least one of the processor(s) 1204, system memory 1202 coupled to system control module 1206, non-volatile memory (NVM)/storage (not shown) coupled to system control module 1206, storage 1208 coupled to system control module 1206 and one or more communications interface(s) 1210 coupled to system control module 1206. The various FIG. 12 components may be coupled together via couplings 1230, 1240, 1250, 1260, as shown. In some embodiments, the system 1200 may include a device or optoelectronic assembly and provide a logic/module that performs functions aimed at reconstructing depth images as described herein.

In some embodiments, the system 1200 may include one or more computer-readable media (e.g., system memory or NVM/storage) having instructions and one or more processors (e.g., processor(s) 1204) coupled with the one or more computer-readable media and configured to execute the instructions to implement a module to perform depth image reconstruction actions described herein.

System control module 1206, for one embodiment, may include any suitable interface controllers to provide for any suitable interface to at least one of the processor(s) 1204 and/or to any suitable device or component in communication with system control module 1206.

System control module 1206 may include memory controller module 1220 to provide an interface to system memory 1202. The memory controller module 1220 may be a hardware module, a software module, and/or a firmware module, or any combination thereof. System memory 1202 may be used to load and store data and/or instructions, for example, for system 1200. System memory 1202 for one embodiment may include any suitable volatile memory, such as suitable DRAM, for example. System control module 1206 for one embodiment may include one or more input/output (I/O) controller(s) to provide an interface to NVM/storage and communications interface(s).

The NVM/storage may be used to store data and/or instructions, for example. NVM/storage may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. The NVM/storage 1206 may include a storage resource physically part of a device on which the system 1200 is installed or it may be accessible by, but not necessarily a part of, the device. For example, the NVM/storage may be accessed over a network via the communications interface(s).

Communications interface(s) may provide an interface for system 1200 to communicate over one or more network(s) and/or with any other suitable device. The system 1200 may wirelessly communicate with the one or more components of the wireless network in accordance with any of one or more wireless network standards and/or protocols.

For one embodiment, at least one of the processor(s) 1204 may be packaged together with logic for one or more controller(s) of system control module 1206, e.g., memory controller module 1220. For one embodiment, at least one of the processor(s) 1204 may be packaged together with logic for one or more controllers of system control module 1206 to form a System in Package (SiP). For one embodiment, at least one of the processor(s) 1204 may be integrated on the same die with logic for one or more controller(s) of system control module 1206. For one embodiment, at least one of the processor(s) 1204 may be integrated on the same die with logic for one or more controller(s) of system control module 1206 to form a System on Chip (SoC).

In various embodiments, the system 1200 may have more or less components, and/or different architectures. For example, in some embodiments, the system 1200 may include one or more of a camera, a keyboard, liquid crystal display (LCD) screen (including touch screen displays), non-volatile memory port, multiple antennas, graphics chip, application-specific integrated circuit (ASIC), and speakers.

In various implementations, the system 1200 may be, but is not limited to, a mobile computing device (e.g., a laptop computing device, a handheld computing device, a tablet, a netbook, etc.), a laptop, a netbook, a notebook, an ultrabook, a smartphone, a tablet, a personal digital assistant (PDA), an ultramobile PC, a mobile phone, a desktop computer, a server, a printer, a scanner, a monitor, a set-top box, an entertainment control unit, a digital camera, a portable music player, or a digital video recorder. In further implementations, the system 1200 may be any other electronic device.

FIG. 13 describes an example flow 1300 of depth image construction by minimization of a functional. More particularly, after start 1302, a product matrix C is constructed in an operation 1304. Next, in operation 1306, a functional is constructed. In operation 1308, there is performed iterative minimization of the functional. A depth profile is finally produced in operation 1310, after which the flow ends 1320.

Figure 14:
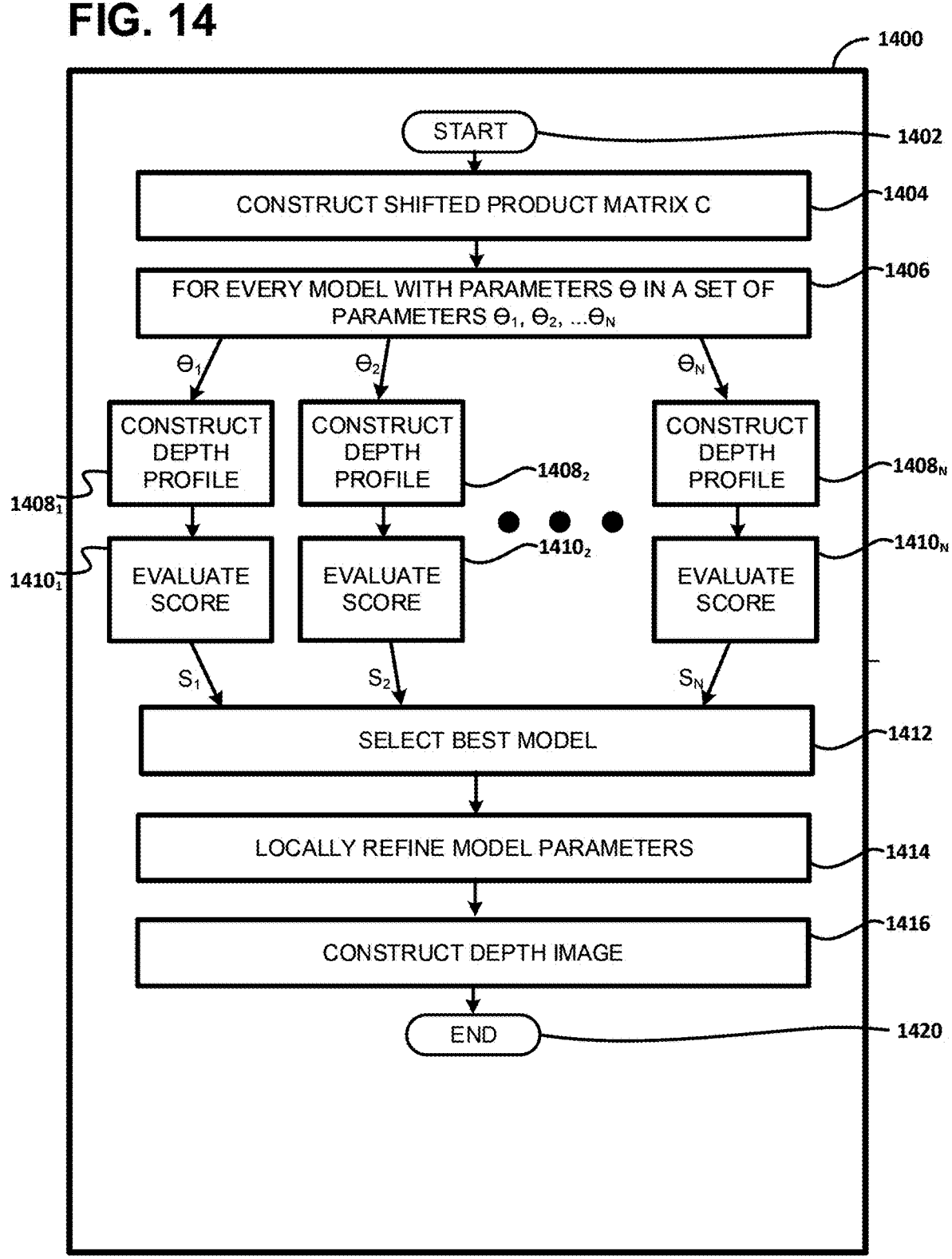
FIG. 14 describes an example flow of fitting a parametric model to the data to construct the depth image

FIG. 14 describes an example flow 1400 of fitting a parametric model to the data to construct the depth image. More particularly, after start 1402, a shifter product matrix C is constructed in an operation 1404. Then (operation 1406), for every model with parameters θ in a set of parameters $\theta_1, \theta_2, \ldots \theta_N$, a depth profile is constructed (operations $1408_1, 1408_2, \ldots \theta 1408_N$) and a score thereof is evaluated (operations $1410_1, 1410_2, \ldots \theta 1410_N$). At operation 1412, the scores are used to select a best model. Next, model parameters are locally refined at operation 1414, and then a depth model is constructed in an operation 1416. Finally, the flow ends 1420.

Operations for various embodiments may have been described with reference to the figures and accompanying examples. Some of the figures may include a timing flow and/or logic flow. It can be appreciated that an illustrated timing flow and/or logic flow merely provides one example of how the described functionality may be implemented. Further, a given timing flow and/or logic flow does not necessarily have to be executed in the order presented unless otherwise indicated. In addition, a timing flow and/or logic flow may be implemented by a hardware element, a software element executed by a processor, or any combination thereof. The embodiments are not limited in this context.

Phraseology within this disclosure (including claims) reciting any phrase such as an item (e.g., an element) "at least a portion of which is implemented in hardware" (or something similar or analogous), should be interpreted as meaning that the item may be embodied as a hardware/software combination which operate together (i.e., the hardware effects the operations of the software. That is, software never operates alone and necessarily involves operation with hardware.

FIG. 15 illustrates one embodiment of an article of manufacture 1500. As shown, the article 1500 may include a storage medium 1502 to store depth image reconstruction logic 1504 for performing at least some of the various operations in accordance with the described embodiments. In various embodiments, the article 1500 may be implemented by various systems, components, and/or modules.

The article 1500 and/or machine-readable storage medium 1502 may include one or more types of computer-readable storage media capable of storing data, including volatile memory or, non-volatile memory, removable or non-removable memory, erasable or non-erasable memory, writeable or re-writeable memory, and so forth. Examples of a machine-readable storage medium may include, without limitation, RAM, DRAM, DRAM, SDRAM, static RAM (SRAM), ROM, programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information.

The article 1500 and/or machine-readable storage medium 1502 may store depth image reconstruction logic 1504 including instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The depth image reconstruction logic 1504 may include, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

The detailed disclosure now turns to providing examples that pertain to further embodiments. Examples/embodiments provided below are intended to be exemplary and non-limiting. Features/arrangements from any example/embodiment can be freely applied to any other example/embodiment.

An example 1 concerning an apparatus, comprising:

a processor; and a non-transitory computer readable medium to store a set of instructions for execution by the processor, the set of instructions to cause the processor to:

collect multiple data sets for a code-modulated light pulse reflected from an object in a scene, with each data set associated with a direction in a set of directions for the reflected code-modulated light pulse;

assign a fitness value to each data set based on one or more parameters of a model; and reconstruct a depth image providing a depth at each direction based on a corresponding data set and fitness value, the depth to correspond with a round-trip delay time of the code-modulated light pulse.

An example 2 concerning the apparatus of example 1, the set of instructions to include instructions to generate the fitness value based on at least one direction from the set of directions.

An example 3 concerning the apparatus of any one of examples 1-2, the set of instructions to include instructions to generate the fitness value for a subject data set of a subject direction, based on both the data set for the subject direction and at least one other data set of at least one other direction, from the set of directions.

An example 4 concerning the apparatus of any one of examples 1-3, where reconstruction of the depth in each subject direction in the depth image is performed by finding the one or more parameters of the model, which improve a fitting criterion fitness to data at at least one direction surrounding the subject direction.

An example 5 concerning the apparatus of any one of examples 1-4, the set of instructions to include instructions to generate the fitness value.

An example 6 concerning the apparatus of any one of examples 1-5, comprising a beam emitter device to output an emitted pulse of electromagnetic radiation modulated by a code.

An example 7 concerning the apparatus of any one of examples 1-6, comprising a beam steerer device configured to steer an emitted pulse of electromagnetic radiation in different directions toward a scene to image.

An example 8 concerning a method of reconstructing a depth image of a scene, the method comprising:

collecting multiple data sets for a code-modulated light pulse reflected from an object in a scene, with each data set associated with a direction in a set of directions for the reflected code-modulated light pulse;

assigning a fitness value to each data set based on one or more parameters of a model; and reconstructing a depth image providing a depth at each direction based on a corresponding data set and fitness value, the depth to correspond with a round-trip delay time of the code-modulated light pulse.

An example 9 concerning the method of example 8, comprising: generating the fitness value based on at least one direction from the set of directions.

An example 10 concerning the method of any one of examples 8-9, comprising: generating the fitness value for a subject data set of a subject direction, based on both the data set for the subject direction and at least one other data set of at least one other direction, from the set of directions.

An example 11 concerning the method of any one of examples 8-10, comprising: reconstructing the depth in each subject direction in the depth image by finding the one or more parameters of the model, which improve a fitting criterion fitness to data at least one direction surrounding the subject direction.

An example 12 concerning the method of any one of examples 8-11, comprising: the assigning including generating the fitness value.

An example 13 concerning the method of any one of examples 8-12, comprising: outputting an emitted pulse of electromagnetic radiation modulated by a code, via a beam emitter device.

An example 14 concerning the method of any one of examples 8-13, comprising: steering an emitted pulse of electromagnetic radiation in different directions toward a scene to image, via a beam steerer device.

An example 15 concerning an article of manufacture comprising a storage medium containing instructions that when executed cause processing circuitry to:

collect multiple data sets for a code-modulated light pulse reflected from an object in a scene, with each data set associated with a direction in a set of directions for the reflected code-modulated light pulse;

assign a fitness value to each data set based on one or more parameters of a model; and reconstruct a depth image providing a depth at each direction based on a corresponding data set and fitness value, the depth to correspond with a round-trip delay time of the code-modulated light pulse.

An example 16 concerning the article of manufacture of example 15, comprising the storage medium containing instructions that when executed cause the processing circuitry to: generate the fitness value based on at least one direction from the set of directions.

An example 17 concerning the article of manufacture of any one of examples 15-16, comprising the storage medium containing instructions that when executed cause the processing circuitry to: generate the fitness value for a subject data set of a subject direction, based on both the data set for the subject direction and at least one other data set of at least one other direction, from the set of directions.

An example 18 concerning the article of manufacture of any one of examples 15-17, comprising the storage medium containing instructions that when executed cause the processing circuitry to: reconstruct the depth in each subject direction in the depth image by finding the one or more parameters of the model, which improve a fitting criterion fitness to data at least one direction surrounding the subject direction.

An example 19 concerning the article of manufacture of any one of examples 15-18, comprising the storage medium containing instructions that when executed cause the processing circuitry to: generate the fitness value.

An example 20 concerning the article of manufacture of any one of examples 15-19, comprising the storage medium containing instructions that when executed cause the processing circuitry to: outputting an emitted pulse of electromagnetic radiation modulated by a code, via a beam emitter device.

An example 21 concerning the article of manufacture of any one of examples 15-20, comprising the storage medium containing instructions that when executed cause the processing circuitry to: steering an emitted pulse of electromagnetic radiation in different directions toward a scene to image, via a beam steerer device.

An example 22 concerning an apparatus, comprising:
a processor; and
a non-transitory computer readable medium to store a set of instructions for execution by the processor, the set of instructions to cause the processor to:

obtain data of a code-modulated light pulse reflected from an object in a scene, where a round-trip delay time of the light pulse is proportional to a depth of the object from the apparatus; and reconstruct a depth image detailing a depth at each of a collection of directions, where depth reconstruction of the depth in each subject direction in the depth image is performed by finding parameters of a model, which improve a fitting criterion fitness to the data at at least one direction surrounding the subject direction.

An example 23 concerning the apparatus as claimed in example 22, wherein the reconstruct a depth image is performed by finding parameters of a model, which optimize a fitting criterion fitness to the data at at least one direction surrounding the subject direction.

An example 24 concerning the apparatus as claimed in any one of examples 22-23, wherein the model is one of: an adaptive window model; a parametric model; a synthesis dictionary model; a variational model; an analysis dictionary model; and, a two-dimensional model.

An example 25 concerning the apparatus as claimed in any one of examples 22-24, further comprising:
a beam emitter device configured to output an emitted pulse of electromagnetic radiation modulated by a code;
a beam steerer device configured to steer the emitted pulse in different directions toward a scene to be imaged; and
a detector configured to receive the emitted pulse reflected from the object in the scene.

An example 26 concerning the apparatus as claimed in any one of examples 22-25, wherein the beam emitter device comprises:
a laser source to produce a laser as the emitted pulse of electromagnetic radiation modulated by the code.

An example 26 concerning the apparatus as claimed in any one of examples 22-26, wherein the beam emitter device comprises:
at least one of a splitter and filter to divide the laser into plural beams.

An example 28 concerning the apparatus as claimed in any one of examples 22-26, wherein the beam emitter device comprises:
at least one of a splitter and filter to divide the laser into plural emitted pulses of electromagnetic radiation modulated by a code, for sequential output in different directions toward a scene to be imaged.

An example 29 concerning the apparatus as claimed in any one of examples 22-26, wherein the beam emitter device comprises:
at least one of a splitter and filter to divide the laser into plural emitted pulses of electromagnetic radiation modulated by a code, for simultaneous output in different directions toward a scene to be imaged.

An example 30 concerning the apparatus as claimed in any one of examples 22-26, wherein the beam emitter device comprises:
at least one of a splitter and filter to divide the laser into plural emitted pulses of electromagnetic radiation modulated by a code, for parallel output in different directions toward a scene to be imaged.

An example 31 concerning the apparatus as claimed in any one of examples 22-30, wherein the beam emitter device comprises:
plural laser sources to each output a laser as the emitted pulse of electromagnetic radiation modulated by the code.

An example 32 concerning the apparatus as claimed in any one of examples 22-30, wherein the beam emitter device comprises:
plural laser sources to each output a laser as emitted pulses of electromagnetic radiation modulated by the code, for plural laser beams for sequential output in different directions toward a scene to be imaged.

An example 33 concerning the apparatus as claimed in any one of examples 22-30, wherein the beam emitter device comprises:
plural laser sources to each output a laser as emitted pulses of the electromagnetic radiation modulated by the code, for plural laser beams for simultaneous output in different directions toward a scene to be imaged.

An example 34 concerning the apparatus as claimed in any one of examples 22-30, wherein the beam emitter device comprises:
plural laser sources to each output a laser as emitted pulses of the electromagnetic radiation modulated by the code, for plural laser beams for parallel output in different directions toward a scene to be imaged.

An example 35 concerning the apparatus as claimed in any one of examples 22-34, further comprising:
a data collector configured to collect data of the code-modulated light pulse reflected from an object in a scene.

An example 36 concerning the apparatus as claimed in any one of examples 22-35, further comprising:
a memory; and,
a storage manager to coordinate storage of the data of the code-modulated light pulse reflected from the object and collected by the data collector, in the memory.

An example 37 concerning the apparatus as claimed in any one of examples 22-36, further comprising:
a light detector configured to detect the code-modulated light pulse reflected from the object.

An example 38 concerning the apparatus as claimed in example 37, further comprising:
a memory; and
a storage manager to coordinate storage of the data of the code-modulated light pulse reflected from the object and detected by the light detector, in the memory.

An example 39 concerning the apparatus as claimed in any one of examples 22-38, further comprising:
a camera configured to capture an image of the object in the scene.

An example 40 concerning the apparatus as claimed in any one of examples 22-39, further comprising:
a beam emitter device configured to output an emitted pulse of electromagnetic radiation modulated by a code; and,
the set of instructions to further cause the processor to control the beam emitter device to at least one of:
output the emitted pulse of electromagnetic radiation; and
amplitude modulate the emitted pulse of electromagnetic radiation, to include the code in the emitted pulse of electromagnetic radiation.

An example 41 concerning the apparatus as claimed in any one of examples 22-39, further comprising:
a beam emitter device configured to output an emitted pulse of electromagnetic radiation modulated by a code; and,
a beam emitter controller to control the beam emitter device to at least one of:
output the emitted pulse of electromagnetic radiation; and
amplitude modulate the emitted pulse of electromagnetic radiation, to include the code in the emitted pulse of electromagnetic radiation.

An example 42 concerning the apparatus as claimed in any one of examples 22-41, further comprising:
the beam emitter controller to control the beam emitter device to incorporate a predetermined code into the emitted pulse of electromagnetic radiation, at predetermined times.

An example 43 concerning the apparatus as claimed in any one of examples 22-41, further comprising:
the beam emitter controller to control the beam emitter device to incorporate a predetermined code into the emitted pulse of electromagnetic radiation, periodically.

An example 44 concerning the apparatus as claimed in any one of examples 22-41, further comprising:

the beam emitter controller to control the beam emitter device to incorporate a same predetermined code into the emitted pulse of electromagnetic radiation, at differing predetermined times.

An example 45 concerning the apparatus as claimed in any one of examples 22-41, further comprising:

the beam emitter controller to control the beam emitter device to incorporate differing predetermined codes into the emitted pulse of electromagnetic radiation, at differing predetermined times, respectively.

An example 46 concerning the apparatus as claimed in any one of examples 22-45, further comprising:

a beam steerer device configured to steer an emitted pulse in different directions toward a scene to be imaged; and, the set of instructions to further cause the processor to control the beam steerer device to at least one of:
a range of steering;
a speed of steering; and
a direction of steering.

An example 47 concerning the apparatus as claimed in any one of examples 22-45, further comprising:

a beam emitter device configured to output an emitted pulse of electromagnetic radiation modulated by a code; and, a beam emitter controller to control the beam emitter device to at least one of:
output the emitted pulse of electromagnetic radiation; and
amplitude modulate the emitted pulse of electromagnetic radiation, to include the code in the emitted pulse of electromagnetic radiation.

An example 48 concerning the apparatus as claimed in any one of examples 22-47, wherein the processor is at least one of a microprocessor and an application-specific integrated circuit (ASIC).

An example 49 concerning the apparatus as claimed in any one of examples 22-48, wherein the model is the adaptive window model having a function:

$$C_{|t_1,t_2|}(\tau) = \int_{t_1}^{t_2} C(t, \tau(t)) dt,$$

where:
"C" is the matrix of shifted product of the transmitted and received signals or a smoothed version thereof;
"t" is time; and
"$\tau$" is a phase shift or delay of the signal, and wherein depth reconstruction is performed by finding an interval |t1,t2| within an entire window [0,T] on which to search for a cross-correlation peak, via seeking two parameters $0 \leq t1 < t2 \leq T$ to distinguish a peak of the function according to a predetermined evaluation.

An example 50 concerning the apparatus as claimed in any one of examples 22-49, wherein the predetermined evaluation to distinguish the peak of the function via one of: a value of the peak; a ratio between the peak and a second-highest local maximum; and a combination of the value of the peak and the ratio between the peak and a second-highest local maximum.

An example 51 concerning the apparatus as claimed in any one of examples 22-48, wherein the model is parametric model assuming that $\tau(t)$ can be parameterized by some vector $\theta \in \mathbb{R}^k$ and having a function:

$$\tau_\theta = \theta_1 + \theta_2 t,$$

where:
"t" is time;
"$\tau$" is a phase shift or delay of the signal; and
"$\theta$" is 2-vector containing the depth of the plane and its slope in time units; and wherein solution is carried out using a Hough transform, for predetermine-sized k.

An example 52 concerning the apparatus as claimed in any one of examples 22-48, wherein the model is the synthesis dictionary model having $d(t)^T = (d_1(t), \ldots, d_k(t))$ denoting a collection of continuous atoms of a dictionary and r represented as $\tau_\theta(t) = d(t)^T \theta$, and having a function:

$$\tau^* = d(t)^T \arg\max_\theta \int_0^T C(t, d(t)^T \theta) dt - \lambda \|\theta\|_1.$$

where:
"C" is the matrix of shifted product of the transmitted and received signals or a smoothed version thereof;
"t" is time;
"$\tau$" is a phase shift or delay of the signal;
"T" denotes a vector transpose;
"*" denotes optimal solution;
"$\theta$" is the set of linear combination coefficients; and,
"$\lambda$" is a regularization parameter.

An example 53 concerning the apparatus as claimed in any one of examples 22-48, wherein the model is the variational model having a function:

$$\tau^* = \arg\max_{\tau(t)} \int_0^T C(t, \tau(t)) dt - R(\tau)$$

where:
"C" is the matrix of shifted product of the transmitted and received signals or a smoothed version thereof;
"R" is regularization functional;
"t" is time;
"$\tau$" is the delay of the signal;
"T" is integration time; and,
"*" denotes optimal solution; and wherein depth reconstruction is performed by finding a shortest path, for which dynamic programming solvers exist.

An example 54 concerning the apparatus as claimed in any one of examples 22-48, wherein the model is the analysis dictionary model in which $R(\tau)$ is obtained via projection of $\tau$ on an analysis dictionary and demanding sparsity via a function:

$$R(\tau) = \Sigma_i \Sigma_t \int_0^T |(h_i * \tau)(t)| dt,$$

where:
"h_i" is the i-th filter in a filter bank;
"R" is the regularization functional;
"t" is time;
"$\tau$" is the delay of the signal;
"T" is integration time; and,
"*" denotes convolution.
where $h_i(t)$ is a collection of shift-invariant filters.

An example 55 concerning the apparatus as claimed in any one of examples 22-48, wherein the model is the two-dimensional model where $C_\eta(t, \tau) = x(t-\tau) y_\eta(t)$ and $\eta$ denotes a spatial coordinate perpendicular to a scanning direction, the two-dimensional model having a function:

$$\tau^* = \arg\max_{\tau \in T} \int \int_0^T C_\eta(t, \tau(t, \eta)) dt d\eta.$$

where:

"C" is the matrix of shifted product of the transmitted and received signals or a smoothed version thereof;

"t" is time;

"τ" is a phase shift or delay of the signal;

"T" is a family of models describing the depth image;

"T" is integration time;

"*" denotes optimal solution; and,

"η" if is a spatial coordinate perpendicular to a scanning direction (i.e., a scanline number).

An example 56 concerning the apparatus as claimed in any one of examples 22-55, wherein in the depth reconstruction, the set of instructions cause the processor to:

construct a product matrix C;

construct a functional; and performed iterative minimization of the functional.

An example 57 concerning the apparatus as claimed in any one of examples 22-55, wherein in the depth reconstruction, the set of instructions cause the processor to:

construct a shifted product matrix C;

construct a depth profile for every model with parameters θ in a set of parameters $\theta_1, \theta_2, \ldots \theta_N$;

evaluate a score of the depth profile for said every model;

select a model based upon the scored of the depth profile for said every model.

An example 58 concerning a method of reconstructing a depth image of a scene, the method comprising:

obtaining data of a code-modulated light pulse reflected from an object in a scene, where a round-trip delay time of the light pulse is proportional to a depth of the object from a predetermined reference point; and reconstructing a depth image detailing a depth at each of a collection of directions, where depth reconstruction of the depth in each subject direction in the depth image is performed by finding parameters of a model, which improve a fitting criterion fitness to the data at at least one direction surrounding the subject direction.

An example 59 concerning the method as claimed in example 58, wherein the reconstructing a depth image is performed by finding parameters of a model, which optimize a fitting criterion fitness to the data at at least one direction surrounding the subject direction.

An example 60 concerning the method as claimed in any one of examples 58-59, wherein the model is one of: an adaptive window model; a parametric model; a synthesis dictionary model; a variational model; an analysis dictionary model; and, a two-dimensional model.

An example 61 concerning the method as claimed in any one of examples 58-60, further comprising:

outputting an emitted pulse of electromagnetic radiation modulated by a code, via a beam emitter device;

steering the emitted pulse in different directions toward a scene to be imaged, via a beam steerer device; and receiving the emitted pulse reflected from the object in the scene, via a detector.

An example 62 concerning the method as claimed in any one of examples 58-61, wherein the outputting comprises:

producing a laser as the emitted pulse of electromagnetic radiation modulated by the code, via a laser source.

An example 63 concerning the method as claimed in any one of examples 58-62, wherein the outputting comprises:

dividing the laser into plural beams, via at least one of a splitter and filter.

An example 64 concerning the method as claimed in any one of examples 58-62, wherein the outputting comprises:

dividing the laser into plural emitted pulses of electromagnetic radiation modulated by a code, for sequential output in different directions toward a scene to be imaged, via at least one of a splitter and filter.

An example 65 concerning the method as claimed in any one of examples 58-62, wherein the outputting comprises:

dividing the laser into plural emitted pulses of electromagnetic radiation modulated by a code, for simultaneous output in different directions toward a scene to be imaged, via at least one of a splitter and filter.

An example 66 concerning the method as claimed in any one of examples 58-62, wherein the outputting comprises:

dividing the laser into plural emitted pulses of electromagnetic radiation modulated by a code, for parallel output in different directions toward a scene to be imaged, via at least one of a splitter and filter.

An example 67 concerning the method as claimed in any one of examples 58-66, wherein the outputting comprises:

outputting, via each of plural laser sources, a laser as the emitted pulse of electromagnetic radiation modulated by the code.

An example 68 concerning the method as claimed in any one of examples 58-66, wherein the outputting comprises:

outputting, via each of plural laser sources, a laser as emitted pulses of electromagnetic radiation modulated by the code, for plural laser beams for sequential output in different directions toward a scene to be imaged.

An example 69 concerning the method as claimed in any one of examples 58-66, wherein the outputting comprises:

outputting, via each of plural laser sources, a laser as emitted pulses of the electromagnetic radiation modulated by the code, for plural laser beams for simultaneous output in different directions toward a scene to be imaged.

An example 70 concerning the method as claimed in any one of examples 58-66, comprising the beam emitter device:

outputting, via each of plural laser sources, a laser as emitted pulses of the electromagnetic radiation modulated by the code, for plural laser beams for parallel output in different directions toward a scene to be imaged.

An example 71 concerning the method as claimed in any one of examples 58-70, further comprising:

collecting data of the code-modulated light pulse reflected from an object in a scene, via a data collector.

An example 72 concerning the method as claimed in any one of examples 58-71, further comprising:

coordinating storage of the data of the code-modulated light pulse reflected from the object and collected by the data collector, in a memory, via a storage manager.

An example 73 concerning the method as claimed in any one of examples 58-72, further comprising:

detecting the code-modulated light pulse reflected from the object, via a light detector.

An example 74 concerning the method as claimed in example 73, further comprising:

coordinating storage of the data of the code-modulated light pulse reflected from the object and collected by the data collector, in a memory, via a storage manager.

An example 75 concerning the method as claimed in any one of examples 58-74, further comprising:

capturing an image of the object in the scene, via a camera.

An example 76 concerning the method as claimed in any one of examples 58-75, further comprising:

outputting an emitted pulse of electromagnetic radiation modulated by a code, via a beam emitter device; and, amplitude modulating the emitted pulse of electromagnetic radiation, to include the code in the emitted pulse of electromagnetic radiation.

An example 77 concerning the method as claimed in any one of examples 58-75, further comprising:

outputting an emitted pulse of electromagnetic radiation modulated by a code, via a beam emitter device; and, controlling the beam emitter device to at least one of:

output the emitted pulse of electromagnetic radiation; and amplitude modulate the emitted pulse of electromagnetic radiation, to include the code in the emitted pulse of electromagnetic radiation.

An example 78 concerning the method as claimed in any one of examples 58-77, further comprising:

controlling the beam emitter controller to control the beam emitter device to incorporate a predetermined code into the emitted pulse of electromagnetic radiation, at predetermined times.

An example 79 concerning the method as claimed in any one of examples 58-77, further comprising:

controlling the beam emitter controller to control the beam emitter device to incorporate a predetermined code into the emitted pulse of electromagnetic radiation, periodically.

An example 80 concerning the method as claimed in any one of examples 58-77, further comprising:

controlling the beam emitter controller to control the beam emitter device to incorporate a same predetermined code into the emitted pulse of electromagnetic radiation, at differing predetermined times.

An example 81 concerning the method as claimed in any one of examples 58-77, further comprising:

controlling the beam emitter controller to control the beam emitter device to incorporate differing predetermined codes into the emitted pulse of electromagnetic radiation, at differing predetermined times, respectively.

An example 82 concerning the method as claimed in any one of examples 58-81, further comprising:

steering an emitted pulse in different directions toward a scene to be imaged, via a beam steerer device; and, controlling the beam steerer device to control at least one of:

a range of steering;

a speed of steering; and a direction of steering.

An example 83 concerning the method as claimed in any one of examples 58-81, further comprising:

outputting an emitted pulse of electromagnetic radiation modulated by a code, via a beam emitter device; and, controlling the beam emitter device, via a beam emitter controller, to at least one of:

output the emitted pulse of electromagnetic radiation; and amplitude modulate the emitted pulse of electromagnetic radiation, to include the code in the emitted pulse of electromagnetic radiation.

An example 84 concerning the method as claimed in any one of examples 58-83, wherein the method is implemented via a processor which is at least one of a microprocessor and an application-specific integrated circuit (ASIC).

An example 85 concerning the method as claimed in any one of examples 58-84, wherein the model is the adaptive window model having a function:

$$C_{|t_1,t_2|}(\tau) = \int_{t_1}^{t_2} C(t,\tau)(t))dt,$$

where:

"C" is the matrix of shifted product of the transmitted and received signals or a smoothed version thereof;

"t" is time; and

"τ" is a phase shift or delay of the signal, and wherein depth reconstruction is performed by finding an interval |t1,t2| within an entire window [0,T] on which to search for a cross-correlation peak, via seeking two parameters 0≤t1<t2≤T to distinguish a peak of the function according to a predetermined evaluation.

An example 86 concerning the method as claimed in any one of examples 58-84, wherein the predetermined evaluation to distinguish the peak of the function via one of: a value of the peak; a ratio between the peak and a second-highest local maximum; and a combination of the value of the peak and the ratio between the peak and a second-highest local maximum.

An example 87 concerning the method as claimed in any one of examples 58-84, wherein the model is parametric model assuming that τ(t) can be parameterized by some vector $\theta \in \mathbb{R}^k$ and having a function:

$$\tau_\theta = \theta_1 + \theta_2 t,$$

where:

"t" is time;

"τ" is a phase shift or delay of the signal; and

"θ" is 2-vector containing the depth of the plane and its slope in time units; and wherein solution is carried out using a Hough transform, for predetermine-sized k.

An example 88 concerning the method as claimed in any one of examples 58-84, wherein the model is the synthesis dictionary model having $d(t)^T = (d_1(t), \ldots, d_k(t))$ denoting a collection of continuous atoms of a dictionary and r represented as $\tau_\theta(t) = d(t)^T \theta$, and having a function:

$$\tau^* = d(t)^T \arg\max_\theta \int_0^T C(t, d(t)^T \theta) dt - \lambda \|\theta\|_1.$$

where:

"C" is the matrix of shifted product of the transmitted and received signals or a smoothed version thereof;

"t" is time;

"τ" is a phase shift or delay of the signal;

"T" denotes a vector transpose;

"*" denotes optimal solution;

"θ" is the set of linear combination coefficients; and,

"λ" is a regularization parameter.

An example 89 concerning the method as claimed in any one of examples 58-94, wherein the model is the variational model having a function:

$$\tau^* = \arg\max_{\tau(t)} \int_0^T C(t, \tau(t)) dt - R(\tau)$$

where:

"C" is the matrix of shifted product of the transmitted and received signals or a smoothed version thereof;

"R" is regularization functional;

"t" is time;

"τ" is the delay of the signal;

"T" is integration time; and,

"*" denotes optimal solution; and wherein depth reconstruction is performed by finding a shortest path, for which dynamic programming solvers exist.

An example 90 concerning the method as claimed in any one of examples 58-94, wherein the model is the analysis dictionary model in which $R(\tau)$ is obtained via projection of $\tau$ on an analysis dictionary and demanding sparsity via a function:

$$R(\tau) = \Sigma_i \int_0^T |(h_i * \tau)(t)| dt,$$

where:
"h_i" is the i-th filter in a filter bank;
"R" is the regularization functional;
"t" is time;
"$\tau$" is the delay of the signal;
"T" is integration time; and,
"*" denotes convolution.
where $h_i(t)$ is a collection of shift-invariant filters.

An example 91 concerning the method as claimed in any one of examples 58-84, wherein the model is the two-dimensional model where $C_\eta(t, \tau) = x(t-\tau)y_\eta(t)$ and $\eta$ denotes a spatial coordinate perpendicular to a scanning direction, the two-dimensional model having a function:

$$\tau^* = \arg\max_{\tau \in T} \int \int_0^T C_\eta(t, \tau(t, \eta)) dt d\eta.$$

where:
"C" is the matrix of shifted product of the transmitted and received signals or a smoothed version thereof;
"t" is time;
"$\tau$" is a phase shift or delay of the signal;
"T" is a family of models describing the depth image;
"T" is integration time;
"*" denotes optimal solution; and,
"$\eta$" if is a spatial coordinate perpendicular to a scanning direction (i.e., a scanline number).

An example 92 concerning the method as claimed in example 58-91, comprising in the depth reconstruction:
constructing a product matrix C;
constructing a functional; and
performing iterative minimization of the functional.

An example 93 concerning the method as claimed in any one of examples 58-91, comprising in the depth reconstruction:
constructing a shifted product matrix C;
constructing a depth profile for every model with parameters $\theta$ in a set of parameters $\theta_1, \theta_2, \ldots \theta_N$;
evaluating a score of the depth profile for said every model;
selecting a model based upon the scored of the depth profile for said every model.

An example 94 concerning an article of manufacture comprising a storage medium containing instructions that when executed cause processing circuitry to:
obtain data of a code-modulated light pulse reflected from an object in a scene, where a round-trip delay time of the light pulse is proportional to a depth of the object from a predetermined reference point; and
reconstruct a depth image detailing a depth at each of a collection of directions, where depth reconstruction of the depth in each subject direction in the depth image is performed by finding parameters of a model, which improve a fitting criterion fitness to the data at at least one direction surrounding the subject direction.

An example 95 concerning the article of manufacture as claimed in example 94, wherein the reconstruct a depth image is performed by finding parameters of a model, which optimize a fitting criterion fitness to the data at at least one direction surrounding the subject direction.

An example 96 concerning the article of manufacture as claimed in any one of examples 94-95, wherein the model is one of: an adaptive window model; a parametric model; a synthesis dictionary model; a variational model; an analysis dictionary model; and, a two-dimensional model.

An example 97 concerning the article of manufacture as claimed in any one of examples 94-96, comprising the storage medium containing instructions that when executed cause the processing circuitry to:
output an emitted pulse of electromagnetic radiation modulated by a code, via a beam emitter device;
steer the emitted pulse in different directions toward a scene to be imaged, via a beam steerer device; and
receive the emitted pulse reflected from the object in the scene, via a detector.

An example 98 concerning the article of manufacture as claimed in any one of examples 94-97, wherein the output comprises:
producing a laser as the emitted pulse of electromagnetic radiation modulated by the code, via a laser source.

An example 99 concerning the article of manufacture as claimed in any one of examples 94-98, wherein the output comprises:
dividing the laser into plural beams, via at least one of a splitter and filter.

An example 100 concerning the article of manufacture as claimed in example 94-98, wherein the output comprises:
dividing the laser into plural emitted pulses of electromagnetic radiation modulated by a code, for sequential output in different directions toward a scene to be imaged, via at least one of a splitter and filter.

An example 101 concerning the article of manufacture as claimed in any one of examples 94-98, wherein the output comprises:
dividing the laser into plural emitted pulses of electromagnetic radiation modulated by a code, for simultaneous output in different directions toward a scene to be imaged, via at least one of a splitter and filter.

An example 102 concerning the article of manufacture as claimed in any one of examples 94-98, wherein the output comprises:
dividing the laser into plural emitted pulses of electromagnetic radiation modulated by a code, for parallel output in different directions toward a scene to be imaged, via at least one of a splitter and filter.

An example 103 concerning the article of manufacture as claimed in any one of examples 94-102, wherein the output comprises:
outputting, via each of plural laser sources, a laser as the emitted pulse of electromagnetic radiation modulated by the code.

An example 104 concerning the article of manufacture as claimed in any one of examples 94-102, wherein the output comprises:
outputting, via each of plural laser sources, a laser as emitted pulses of electromagnetic radiation modulated by the code, for plural laser beams for sequential output in different directions toward a scene to be imaged.

An example 105 concerning the article of manufacture as claimed in any one of examples 94-102, wherein the output comprises:
outputting, via each of plural laser sources, a laser as emitted pulses of the electromagnetic radiation modulated by the code, for plural laser beams for simultaneous output in different directions toward a scene to be imaged.

An example 106 concerning the article of manufacture as claimed in any one of examples 94-102, comprising the storage medium containing instructions that when executed cause the processing circuitry to:

output, via each of plural laser sources, a laser as emitted pulses of the electromagnetic radiation modulated by the code, for plural laser beams for parallel output in different directions toward a scene to be imaged.

An example 107 concerning the article of manufacture as claimed in any one of examples 94-106, comprising the storage medium containing instructions that when executed cause the processing circuitry to:

collect data of the code-modulated light pulse reflected from an object in a scene, via a data collector.

An example 108 concerning the article of manufacture as claimed in any one of examples 94-107, comprising the storage medium containing instructions that when executed cause the processing circuitry to:

coordinate storage of the data of the code-modulated light pulse reflected from the object and collected by the data collector, in a memory, via a storage manager.

An example 109 concerning the article of manufacture as claimed in any one of examples 94-108, comprising the storage medium containing instructions that when executed cause the processing circuitry to:

detect the code-modulated light pulse reflected from the object, via a light detector.

An example 110 concerning the article of manufacture as claimed in example 109, comprising the storage medium containing instructions that when executed cause the processing circuitry to:

coordinate storage of the data of the code-modulated light pulse reflected from the object and collected by the data collector, in a memory, via a storage manager.

An example 111 concerning the article of manufacture as claimed in any one of examples 94-110, comprising the storage medium containing instructions that when executed cause the processing circuitry to:

capture an image of the object in the scene, via a camera.

An example 112 concerning the article of manufacture as claimed in any one of examples 94-111, comprising the storage medium containing instructions that when executed cause the processing circuitry to:

output an emitted pulse of electromagnetic radiation modulated by a code, via a beam emitter device; and, amplitude modulate the emitted pulse of electromagnetic radiation, to include the code in the emitted pulse of electromagnetic radiation.

An example 113 concerning the article of manufacture as claimed in any one of examples 94-111, comprising the storage medium containing instructions that when executed cause the processing circuitry to:

output an emitted pulse of electromagnetic radiation modulated by a code, via a beam emitter device; and, control the beam emitter device to at least one of:

output the emitted pulse of electromagnetic radiation; and amplitude modulate the emitted pulse of electromagnetic radiation, to include the code in the emitted pulse of electromagnetic radiation.

An example 114 concerning the article of manufacture as claimed in any one of examples 94-113, comprising the storage medium containing instructions that when executed cause the processing circuitry to:

control the beam emitter controller to control the beam emitter device to incorporate a predetermined code into the emitted pulse of electromagnetic radiation, at predetermined times.

An example 115 concerning the article of manufacture as claimed in any one of examples 94-113, comprising the storage medium containing instructions that when executed cause the processing circuitry to:

control the beam emitter controller to control the beam emitter device to incorporate a predetermined code into the emitted pulse of electromagnetic radiation, periodically.

An example 116 concerning the article of manufacture as claimed in any one of examples 94-113, comprising the storage medium containing instructions that when executed cause the processing circuitry to:

control the beam emitter controller to control the beam emitter device to incorporate a same predetermined code into the emitted pulse of electromagnetic radiation, at differing predetermined times.

An example 117 concerning the article of manufacture as claimed in any one of examples 94-113, comprising the storage medium containing instructions that when executed cause the processing circuitry to:

control the beam emitter controller to control the beam emitter device to incorporate differing predetermined codes into the emitted pulse of electromagnetic radiation, at differing predetermined times, respectively.

An example 118 concerning the article of manufacture as claimed in any one of examples 94-117, comprising the storage medium containing instructions that when executed cause the processing circuitry to:

steer an emitted pulse in different directions toward a scene to be imaged, via a beam steerer device; and, control the beam steerer device to control at least one of:

a range of steering;

a speed of steering; and a direction of steering.

An example 119 concerning the article of manufacture as claimed in example 94-117, comprising the storage medium containing instructions that when executed cause the processing circuitry to:

output an emitted pulse of electromagnetic radiation modulated by a code, via a beam emitter device; and, control the beam emitter device, via a beam emitter controller, to at least one of:

output the emitted pulse of electromagnetic radiation; and amplitude modulate the emitted pulse of electromagnetic radiation, to include the code in the emitted pulse of electromagnetic radiation.

An example 120 concerning the article of manufacture as claimed in any one of examples 94 117, wherein the processing circuitry is at least one of a microprocessor and an application-specific integrated circuit (ASIC).

An example 121 concerning the article of manufacture as claimed in any one of examples 94-120, wherein the model is the adaptive window model having a function:

$$C_{|t_1,t_2|}(\tau) = \int_{t_1}^{t_2} C(t, \tau(t)) dt,$$

where:

"C" is the matrix of shifted product of the transmitted and received signals or a smoothed version thereof;

"t" is time; and

"τ" is a phase shift or delay of the signal, and wherein depth reconstruction is performed by finding an interval |t1,t2| within an entire window [0,T] on which to search for a cross-correlation peak, via seeking two parameters 0≤t1<t2≤T to distinguish a peak of the function according to a predetermined evaluation.

An example 122 concerning the article of manufacture as claimed in any one of examples 94-120, wherein the predetermined evaluation to distinguish the peak of the function via one of: a value of the peak; a ratio between the peak and a second-highest local maximum; and a combination of the value of the peak and the ratio between the peak and a second-highest local maximum.

An example 123 concerning the article of manufacture as claimed in any one of examples 94-120, wherein the model is parametric model assuming that τ(t) can be parameterized by some vector θ∈$\mathbb{R}^k$ and having a function:

$$\tau_\theta = \theta_1 + \theta_2 t,$$

where:
"t" is time;
"τ" is a phase shift or delay of the signal; and
"θ" is 2-vector containing the depth of the plane and its slope in time units; and
wherein solution is carried out using a Hough transform, for predetermine-sized k.

An example 124 concerning the article of manufacture as claimed in any one of examples 94-120, wherein the model is the synthesis dictionary model having $d(t)^T = (d_1(t), \ldots, d_k(t))$ denoting a collection of continuous atoms of a dictionary and τ represented as $\tau_\theta(t) = d(t)^T \theta$, and having a function:

$$\tau^* = d(t)^T \arg\max_\theta \int_0^T C(t, d(t)^T \theta) dt - \lambda \|\theta\|_1.$$

where:
"C" is the matrix of shifted product of the transmitted and received signals or a smoothed version thereof;
"t" is time;
"τ" is a phase shift or delay of the signal;
"T" denotes a vector transpose;
"*" denotes optimal solution;
"θ" is the set of linear combination coefficients; and,
"λ" is a regularization parameter.

An example 125 concerning the article of manufacture as claimed in any one of examples 94-120, wherein the model is the variational model having a function:

$$\tau^* = \arg\max_{\tau(t)} \int_0^T C(t, \tau(t)) dt - R(\tau)$$

where:
"C" is the matrix of shifted product of the transmitted and received signals or a smoothed version thereof;
"R" is regularization functional;
"t" is time;
"τ" is the delay of the signal;
"T" is integration time; and,
"*" denotes optimal solution; and
wherein depth reconstruction is performed by finding a shortest path, for which dynamic programming solvers exist.

An example 126 concerning the article of manufacture as claimed in any one of examples 94-120, wherein the model is the analysis dictionary model in which R(τ) is obtained via projection of τ on an analysis dictionary and demanding sparsity via a function:

$$R(\tau) = \Sigma_i \int_0^T |(h_i * \tau)(t)| dt,$$

where:
"h_i" is the i-th filter in a filter bank;
"R" is the regularization functional;
"t" is time;
"τ" is the delay of the signal;
"T" is integration time; and,
"*" denotes convolution.
where h_i(t) is a collection of shift-invariant filters.

An example 127 concerning the article of manufacture as claimed in any one of examples 94-120, wherein the model is the two-dimensional model where $C_\eta(t, \tau) = x(t-\tau) y_\eta(t)$ and η denotes a spatial coordinate perpendicular to a scanning direction, the two-dimensional model having a function:

$$\tau^* = \arg\max_{\tau \in T} \int \int_0^T C_\eta(t, \tau(t, \eta)) dt d\eta.$$

where:
"C" is the matrix of shifted product of the transmitted and received signals or a smoothed version thereof;
"t" is time;
"τ" is a phase shift or delay of the signal;
"T" is a family of models describing the depth image;
"T" is integration time;
"*" denotes optimal solution; and,
"η" if is a spatial coordinate perpendicular to a scanning direction (i.e., a scanline number).

An example 128 concerning the article of manufacture as claimed in any one of examples 94-127, comprising in the depth reconstruction:
constructing a product matrix C;
constructing a functional; and
performing iterative minimization of the functional.

An example 129 concerning the article of manufacture as claimed in any one of examples 94-127, comprising in the depth reconstruction:
constructing a shifted product matrix C;
constructing a depth profile for every model with parameters θ in a set of parameters $\theta_1, \theta_2, \ldots \theta_N$;
evaluating a score of the depth profile for said every model;
selecting a model based upon the scored of the depth profile for said every model.

An example 130 concerning a machine readable medium including code, when executed, to cause a machine to perform the method of any one of examples 58-93.

Unless specifically stated otherwise; it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined from any of the described embodiments, in any suitable manner in one or more embodiments.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

What is claimed is:

1. An apparatus, comprising:
    a processor; and
    a non-transitory computer readable medium to store a set of instructions for execution by the processor, the set of instructions to cause the processor to:
        collect multiple data sets for a code-modulated light pulse reflected from an object in a scene, with each data set associated with a direction in a set of directions for the reflected code-modulated light pulse;
        provide a depth at each direction of the set of directions, wherein providing the depth of a given direction of the set of directions comprises finding one or more parameters of a model that improves a fitness value of a data set to the model, the data set associated with at least one direction surrounding the given direction, the depth corresponding with a round-trip delay time of the code-modulated light pulse at the given direction; and
        reconstruct a depth image based on the provided depth at each direction.

2. The apparatus of claim 1, wherein the set of instructions include instructions to generate the fitness value based on at least one direction from the set of directions.

3. The apparatus of claim 1, wherein the set of instructions include instructions to generate the fitness value for a data set of a subject direction, based on both the data set for the subject direction and at least one other data set of at least one other direction, from the set of directions.

4. The apparatus of claim 1, wherein the set of instructions include instructions to generate the fitness value.

5. The apparatus of claim 1, further comprising a beam emitter device to output an emitted pulse of electromagnetic radiation modulated by a code.

6. The apparatus of claim 1, further comprising a beam steerer device configured to steer an emitted pulse of electromagnetic radiation in different directions toward the scene.

7. The apparatus of claim 1, wherein providing the depth at the given direction comprises finding one parameter of the model that improves the fitness value of the data set to the model.

8. A method of reconstructing a depth image of a scene, the method comprising:
    collecting multiple data sets for a code-modulated light pulse reflected from an object in the scene, with each data set associated with a direction in a set of directions for the reflected code-modulated light pulse;
    providing a depth at each direction of the set of directions, wherein providing the depth of a given direction of the set of directions comprises finding one or more parameters of a model that improves a fitness value of a data set to the model, the data set associated with at least one direction surrounding the given direction, the depth corresponding with a round-trip delay time of the code-modulated light pulse at the given direction, and
    reconstructing the depth image based on the provided depth at each direction.

9. The method of claim 8, comprising: generating the fitness value based on at least one direction from the set of directions.

10. The method of claim 8, comprising: generating the fitness value for a subject data set of a direction, based on both the data set for the subject direction and at least one other data set of at least one other direction, from the set of directions.

11. The method of claim 8, comprising generating the fitness value.

12. The method of claim 8, comprising: outputting an emitted pulse of electromagnetic radiation modulated by a code, via a beam emitter device.

13. The method of claim 8, comprising: steering an emitted pulse of electromagnetic radiation in different directions toward the scene, via a beam steerer device.

14. The method of claim 8, wherein providing the depth at the given direction comprises finding one parameter of the model that improves the fitness value of the data set to the model.

15. An article of manufacture comprising a storage medium containing instructions that when executed cause processing circuitry to:
    collect multiple data sets for a code-modulated light pulse reflected from an object in a scene, with each data set associated with a direction in a set of directions for the reflected code-modulated light pulse;
    provide a depth at each direction of the set of directions, wherein providing the depth of a given direction of the set of directions comprises finding one or more parameters of a model that improves a fitness value of a data set to the model, the data set associated with at least one direction surrounding the given direction, the depth corresponding with a round-trip delay time of the code-modulated light pulse at the given direction; and
    reconstruct a depth image based on the provided depth at each direction.

16. The article of manufacture of claim 15, comprising the storage medium containing instructions that when executed cause the processing circuitry to: generate the fitness value based on at least one direction from the set of directions.

17. The article of manufacture of claim 15, comprising the storage medium containing instructions that when executed cause the processing circuitry to: generate the fitness value for a data set of a subject direction, based on both the data set for the subject direction and at least one other data set of at least one other direction, from the set of directions.

18. The article of manufacture of claim 15, comprising the storage medium containing instructions that when executed cause the processing circuitry to: generate the fitness value.

19. The article of manufacture of claim 15, comprising the storage medium containing instructions that when executed cause the processing circuitry to: outputting an emitted pulse of electromagnetic radiation modulated by a code, via a beam emitter device.

20. The article of manufacture of claim 15, comprising the storage medium containing instructions that when executed cause the processing circuitry to: steering an emitted pulse of electromagnetic radiation in different directions toward a scene to image, via a beam steerer device.

21. The article of manufacture of claim 15, wherein providing the depth at the given direction comprises finding one parameter of the model that improves the fitness value of the data set to the model.

22. An apparatus comprising:

a processor; and a non-transitory computer readable medium to store a set of instructions for execution by the processor, the set of instructions to cause the processor to:

obtain data of a code-modulated light pulse reflected from an object in a scene, where a round-trip delay time of the light pulse is proportional to a depth of the object from the apparatus; and reconstruct a depth image detailing a depth at each of a collection of directions, where depth reconstruction of the depth in each subject direction of the collection of directions in the depth image is performed by finding one or more parameters of a model, that improves a fitness value of data to the model, the data being associated with at least one direction surrounding the subject direction.

23. The apparatus as claimed in claim 22, wherein the reconstruct the depth image is performed by finding one parameter of the model, that improves the fitness value of the data to the model.

24. The apparatus as claimed in claim 22, wherein the model is one of: an adaptive window model; a parametric model; a synthesis dictionary model; a variational model; an analysis dictionary model; and, a two-dimensional model.

25. The apparatus as claimed in claim 22, further comprising:

a beam emitter device configured to output an emitted pulse of electromagnetic radiation modulated by a code;

a beam steerer device configured to steer the emitted pulse in different directions toward the scene; and a detector configured to receive the emitted pulse reflected from the object in the scene.

* * * * *